(12) United States Patent
Pugaczewski et al.

(10) Patent No.: US 6,963,916 B1
(45) Date of Patent: Nov. 8, 2005

(54) NETWORK MANAGEMENT SYSTEM AND GRAPHICAL USER INTERFACE

(75) Inventors: John T. Pugaczewski, White Bear Lake, MN (US); Jeffrey T. Kays, Andover, MN (US); Nicholas P. Chantiloupe, Louis Park, MN (US)

(73) Assignee: Qwest Communications International Inc., Denver, CO (US)

( * ) Notice: Subject to any disclaimer, the term of this patent is extended or adjusted under 35 U.S.C. 154(b) by 547 days.

(21) Appl. No.: 09/470,201

(22) Filed: Dec. 21, 1999

Related U.S. Application Data

(60) Provisional application No. 60/114,424, filed on Dec. 31, 1998, provisional application No. 60/114,429, filed on Dec. 31, 1998, provisional application No. 60/114,428, filed on Dec. 31, 1998, and provisional application No. 60/114,427, filed on Dec. 31, 1998.

(51) Int. Cl.[7] .............................................. G06F 15/16
(52) U.S. Cl. ..................... 709/227; 709/218; 709/249
(53) Field of Search .............................. 709/223, 224, 709/225, 226, 227

(56) References Cited

U.S. PATENT DOCUMENTS

| | | | |
|---|---|---|---|
| 5,444,851 A | | 8/1995 | Woest |
| 5,483,585 A | * | 1/1996 | Parker et al. |
| 5,555,244 A | | 9/1996 | Gupta et al. |
| 5,557,748 A | | 9/1996 | Norris |
| 5,579,482 A | | 11/1996 | Einkauf et al. |
| 5,606,669 A | * | 2/1997 | Bertin et al. ................. 709/223 |
| 5,751,967 A | | 5/1998 | Raab et al. |
| 5,787,074 A | * | 7/1998 | Brownmiller et al. |
| 5,838,907 A | * | 11/1998 | Hansen ........................ 709/223 |
| 5,867,483 A | | 2/1999 | Ennis, Jr. et al. |
| 5,940,488 A | | 8/1999 | DeGrazia et al. |
| 5,942,989 A | * | 8/1999 | Nagasawa et al. |
| 5,953,338 A | * | 9/1999 | Ma et al. |
| 5,961,594 A | * | 10/1999 | Bouvier et al. ............. 709/223 |
| 5,999,179 A | | 12/1999 | Kekic et al. |
| 5,999,524 A | | 12/1999 | Corbalis et al. |
| 6,003,090 A | * | 12/1999 | Puranik et al. ............. 709/224 |
| 6,028,858 A | | 2/2000 | Rivers et al. |
| 6,044,075 A | * | 3/2000 | Le Boudec et al. |
| 6,052,722 A | * | 4/2000 | Taghadoss .................. 709/224 |
| 6,058,103 A | * | 5/2000 | Henderson et al. ......... 709/223 |

OTHER PUBLICATIONS

International Search Report—Apr. 11, 2000.
U.S. Appl. No. 09/469,206, filed Dec. 21, 1999, John T. Pugaczewski et al.
U.S. Appl. No. 09/469,199, filed Dec. 21, 1999, John T. Pugaczewski et al.

* cited by examiner

*Primary Examiner*—Rupal Dharia
*Assistant Examiner*—Q Nguyen
(74) *Attorney, Agent, or Firm*—Brooks Kushman P.C.

(57) ABSTRACT

A network management system and graphical user interface for configuring a network connection between first and second service access points utilizes a configuration manager and information manager to provide a generic set of models so that different manufacturer's nodal processors and other network hardware can be inserted into the network with minimal changes to the software which controls the device. The system comprises an information manager including routing information for the network. The configuration manager operates to establish a connection across each subnet on the route by sending requests to element managers to program the subnet elements.

8 Claims, 20 Drawing Sheets

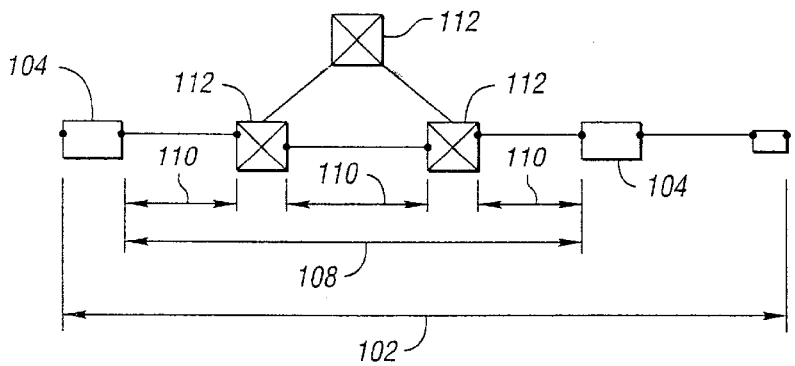
*Fig. 3*
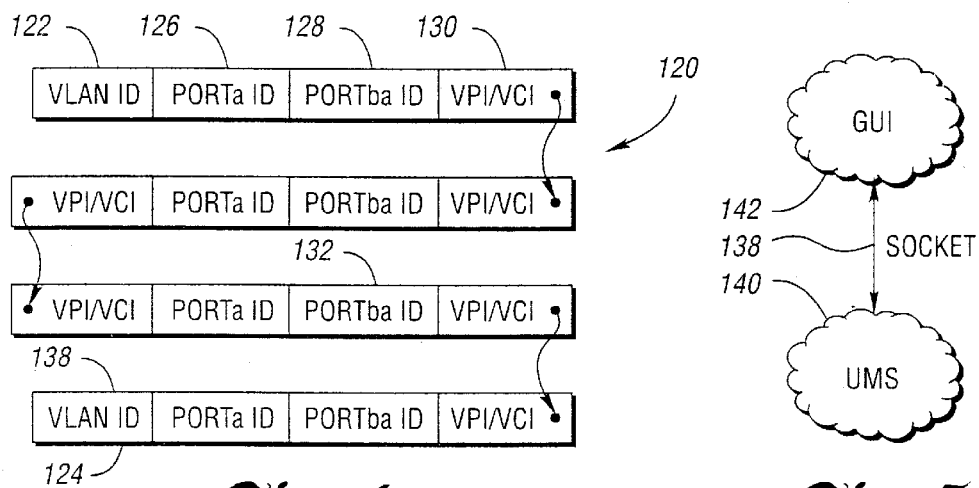
*Fig. 4*
*Fig. 5*
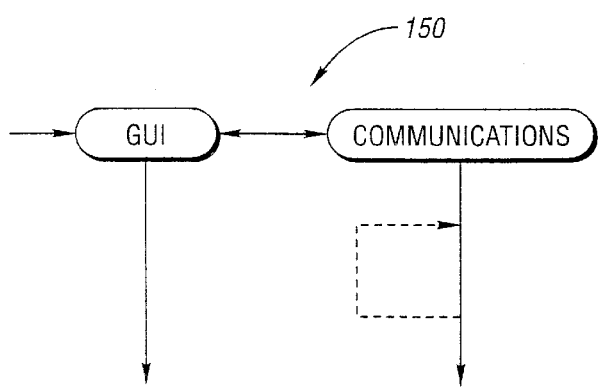
*Fig. 6*
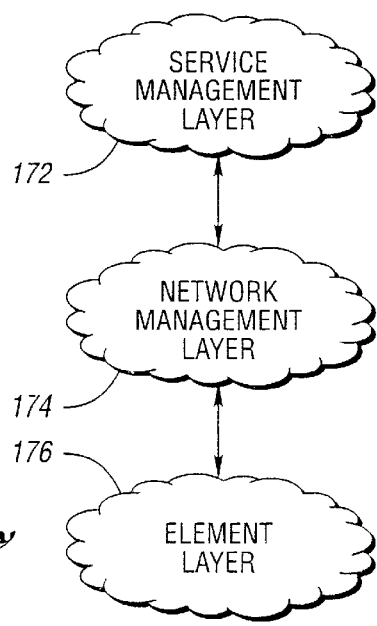
*Fig. 7*

NETWORK MANAGEMENT SYSTEM AND GRAPHICAL USER INTERFACE

CROSS-REFERENCE TO RELATED APPLICATIONS

This application claims the benefit of U.S. Provisional application No. 60/114,424, filed on Dec. 31, 1998 and entitled "Scalable Service Selection for XDSL", U.S. Provisional application No. 60/114,429, filed on Dec. 31, 1998 and entitled "Umbrella Management System User Guide," U.S. Provisional application No. 60/114,428, filed on Dec. 31, 1998 and entitled "Umbrella Management System Prototype and Design," and U.S. Provisional Application No. 60/114,427, filed on Dec. 31, 1998, and entitled "System and Method For Rapid Service Activation and Turn-up of XDSL."

TECHNICAL FIELD

The present invention relates to a network management system for configuring a network connection between first and second service access points, to user interfaces for network management systems, and to online network management applications.

BACKGROUND ART

Existing network architectures, for a single network provider, include a plurality of subnetworks or subnets. Typically, each subnetwork is made up of network hardware in accordance with a specific vendor hardware platform used in that subnetwork. Because the provider has a plurality of subnetworks, the various subnetworks are interconnected with each other, connecting the network hardware components from various different hardware platforms to each other. When network hardware from various different hardware platforms is connected together, configuration is rather difficult. Each hardware platform typically has its own interface that is used to configure that type of hardware.

For example, a first element manager is used to interface with network hardware in a first hardware platform of one subnet, while a different element manger is used to interface with another subnet that uses a different hardware platform. In order to interconnect the various subnets with each other, it is necessary to individually, tediously, configure each subnet to subnet interface on each side with the appropriate configuration tool. As such, when there is a desire to provide a connection between two service access points at spaced apart locations in the overall network, with the path between the access points passing through a number of different subnetworks, configuration can take considerable time, and be quite difficult.

For the foregoing reasons, there is a need for a network management system that overcomes the configuration difficulties associated with existing networks that support different hardware platforms on different subnets. Further, there is a need for improved user interfaces for network management systems, in addition to a need for online network management applications.

DISCLOSURE OF INVENTION

It is, therefore, an object of the present invention to provide a network management system for configuring a network connection between first and second service access points that utilizes an information manager and a configuration manager to utilize a generic set of models so that nodal processors and other network hardware from different manufacturers can be inserted into the network with minimal changes to the software which controls the devices.

In carrying out the above object, a network management system for configuring a network connection between a first service access point and the second service access point over a network is provided. The network includes a plurality of subnets. Each subnet has a corresponding element type and includes at least one programmable element of that type. Each element type has a corresponding element manager. The system comprises an information manager and a configuration manager. The information manager includes routing information for the network. The information manager is operative to determine a route made up of links over the network from the first point to the second point. A network-to-network link connects a pair of adjacent subnets having elements of different types. A network logical link provides a path across a subnet. The configuration manager operates to establish a connection across each subnet on the route by sending a request to the corresponding element manager to program the at least one subnet element. The element is programmed in accordance with the network logical link across that subnet. The configuration manager further operates to establish a network-to-network connection between adjacent subnets on the route in accordance with the network-to-network link between those adjacent subnets to provide the network connection between the first point and the second point.

In a preferred configuration, the route determined by the information manager is in the form of a link list. The link list may be represented by a user logical link composed of a series of network logical links connected by network-to-network links, the series beginning with an originating link and ending with a terminating link.

Further, in a preferred configuration, the information manager further operates to determine the path for each network logical link. Each path includes a series of elements wherein a cross connection provides a path across an element and a physical link connects a pair of adjacent elements. The configuration manager establishes a connection in accordance with the path for each subnet.

Further, in a preferred embodiment, the system further comprises a user interface configured to allow a user to utilize the information manager and the configuration manager to establish a network connection. Further, preferably, the user interface is a graphical user interface (GUI), in a browser executable format such as JAVA. Alternatively, other formats may be used such as ACTIVE X.

Further, in carrying out the present invention, a computer readable storage medium having instruction stored thereon is provided. The computer readable storage medium comprises instructions for determining a route made up of links over the network from the first point to the second point. A network to network link connects a pair of adjacent subnets having elements of different types, and a network logical link provides a path across a subnet. The medium further comprises instructions for establishing a connection across each subnet on the route by sending a request to the corresponding element manager to program the at least one subnet element. A network to network connection is established with adjacent subnets, in accordance with the network to network link between the adjacent subnets to provide the network connection between the first point and the second point.

Even further, in carrying out the present invention, a computer readable storage medium having instructions stored thereon is provided. The instructions are executable by a computer to provide a graphical user interface to a network management system for configuring a network connection between a first service access point and a second service access point over a network including a plurality of subnets. Each subnet has a corresponding element type and includes at least one programmable element of that type. Each element type has a corresponding element manager. The medium further comprises instructions for providing a graphical user interface. The graphical interface includes at least one interface screen displaying information that directs a system user to select the first and second service access points. Further, displayed information directs, that is, provides the option to, the system user to initiate a connection build.

The medium further comprises instructions for initiating the connection build by sending a message to the network management system. The message includes information such that in response to receiving the message, the network management system determines a route made up of links over the network from the first point to the second point. A network to network link connects a pair of adjacent subnets having elements of different types. A network logical link provides a path across a subnet. The network management system establishes a connection across each subnet on the route by sending a request to the corresponding element managers to program the at least one subnet element in accordance with the network logical link across that subnet. Further, the network management system establishes a network to network connection between adjacent subnets on the route in accordance with the network to network link between those adjacent subnets to provide the network connection between the first point and the second point.

In some embodiments, the instructions for providing a graphical interface further comprise instructions for displaying information that directs the system user to terminate the network connection, and instructions for terminating the network connection. The network connection is terminated by sending a message to the network management system. The message includes information such that in response to receiving the message, the network management system terminates the network connection.

In some embodiments, the medium further comprises instructions for establishing a connection between the graphical user interface and the network management system. In some embodiments, the medium further comprises instructions for terminating a connection between the graphical user interface and the network management system. In some embodiments, at least some of the instructions are in a browser executable format such as, for example, JAVA or ACTIVE X. In some embodiments, at least some of the instructions are in a format that is executable on a virtual machine. Further, in some embodiments, the medium further comprises instructions for operating a non-graphical background process for handing communication with the network management system such as, for example, a UNIX daemon.

In some embodiments, the instructions for providing the graphical user interface further comprise instructions for displaying a menubar having a button that, when pressed, causes the at least one interface screen to be displayed. In some embodiments, the instructions for providing the graphical user interface further comprise instructions for displaying a menubar having an expansion arrow/button that, when pressed, causes the at least one interface screen to be displayed. In some embodiments, the instructions for providing the graphical user interface further comprise instructions for displaying the at least one interface screen, wherein the at least one interface screen includes an introduction screen having a plurality of buttons corresponding to introduction documentation. Further, in some embodiments, the at least one interface screen includes a provision screen that directs the system user to select the first and second service access points. Further, in some embodiments, the at least one interface screen includes at least one topology screen that illustrates the route over the network between the first and second access points.

The at least one topology screen may include one or more of the following: a screen illustrating the route at a service management layer, a screen illustrating the route at a network management layer, a screen illustrating the route at a network element layer, and a screen illustrating the route at a network element layer including element provisioning information. Preferably, topology screens at different layers are nested together such that the user may navigate through the different screens by clicking different parts of each layer with the mouse, or in any other suitable fashion. Further, a preferred embodiment includes instructions for displaying a plurality of tab views such that selection of a tab by the user brings the associated view within sight of the user. For example, a screen could contain a plurality of tabs including: introduction, provision, topology, utility, help, and about. Selecting one of the tabs would bring that tab to the front, within sight of the user. The topology tab, for example, would initially show the service management layer, while allowing the user to advance through the topology to the lower levels such as the network management layer and network element layer.

Advantageously, the graphical user interface provides, for the very first time, a graphical display allowing the system user to manager and configure information of the network in a convenient matter. The network is made up of components from various vendors, while the graphical interface is independent of whatever varying hardware components are located in the physical network. The management system communicates with the GUI and with the various element managers.

Yet further, in carrying out the present invention, a computer readable storage medium has instructions stored thereon that are executable by a computer to provide, to a user, a user interface to a network management system for configuring a network connection between a provider access point and a user access point over a network including a permanent virtual circuit (PVC) between a switch and the user access point. The medium further comprises instructions for providing a user interface that directs the user to select a connection bandwidth for the virtual circuit, instructions for receiving, through the user interface, a message indicative of a selected bandwidth from the user, and instructions for remotely provisioning the switch. The switch is provisioned with the network management system in response to receiving the message, and is provisioned to throttle the network connection at the switch such that the connection bandwidth between the switch and the user access point is limited by the selected bandwidth.

Preferably, the user interface is a graphical user interface, and user authentication is used prior to provisioning the switch. Further, in preferred embodiments, the medium further comprises instructions for directing the user to select the time duration for the selected connection bandwidth and, thereafter, throttling the network connection at the switch to the selected bandwidth for the selected time duration, and thereafter, throttling the PVC to the previous bandwidth.

In addition to the computer readable storage medium, a method is also provided, in accordance with the present invention, for remotely provisioning the switch to throttle the permanent virtual circuit (PVC) in response to a message indicating a bandwidth selected by the user during a user session at a graphical user interface. Advantageously, remotely provisioning the switch with the network management system provides bandwidth on-demand for the user.

The advantages associated with embodiments of the present invention are numerous. For example, embodiments of the present invention provide a generic set of models so that nodal processors and other network hardware from different manufacturers can be inserted into the network with minimal changes to the software which controls (for example, provisioning, performance, fault) the device. Advantageously, for the very first time, it is no longer necessary to individually provision each subnet at the network layer level. Instead, embodiments of the present invention provide an umbrella management system that cooperates with the service access and network layers to utilize an information manager and a configuration manager to establish the network connection using logical links that are independent of the particular hardware at the element level, in addition to providing a novel graphical user interface.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 3 is a schematic illustration of an xDSL Path in a DSL implementation;

FIG. 4 shows a linked-list topology for a network logical link;

FIG. 5 shows a class diagram for the UMS;

FIG. 6 shows a thread diagram for the UMS;

FIG. 7 illustrates the topology of the UMS;

BEST MODE FOR CARRYING OUT THE INVENTION

The network management system of the present invention allows for rapid service activation and turn-up of digital subscriber line (xDSL) services including asynchronous transfer mode (ATM) port and xDSL line assignments. Method, procedures, and software developed for dynamic service activation, independent of specific vendor hardware platforms used in the network, which adheres to the industry proposed Telecommunications Management Network (TMN) Network management model are provided by preferred embodiments of the present invention. It is appreciated that the following description explains a prototype UMS developed by the inventors, and that embodiments of the present invention may vary form the specific hardware/software described below. Further, such variations in hardware and software are to be understood and appreciated in light of the more general description of the invention appearing above.

The present invention was developed to minimize system development time and cost should architectures or hardware components form any potential supplier be required to change in the network, for example, the U S West Network. Flexible software of the present invention allows for rapidly scaling the system to accommodate processing large numbers of xDSL spoke subscribers and ATM hub service orders (in a hub and spoke network). The key attributes of the method and software allow for autotranslations to the ATM switch platform and xDSL digital subscriber line access multiplexors (DSLAMs) to be done on-the-fly in virtually real time (approximately 40 seconds per translation). Normal manual processes would require much more time per order, thus saving precious service order representative time to allow for more orders per day per representative. Of course, the present invention may be adapted to other networks besides ATM/DSL networks.

The purpose of the following description is to provide the analysis and design of the UMS Prototype that the inventors have developed as an exemplary implementation for a network management system of the present invention. The analysis includes the object-oriented domain analysis, presented in the form of Booch diagrams. Included in the analysis are the inheritance and aggregation diagrams.

Figure 1:
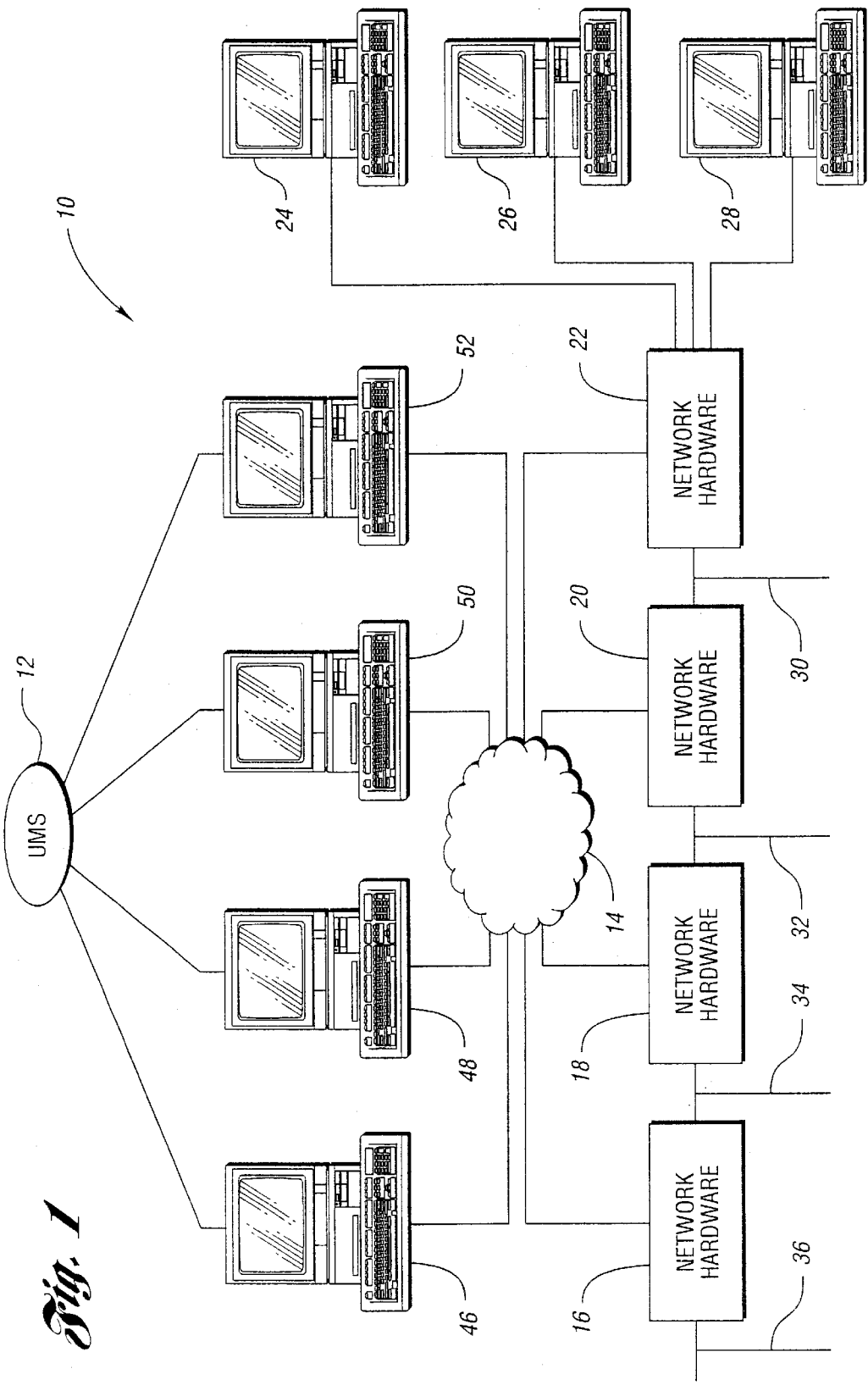
FIG. 1 is a diagram of the Umbrella Management System (UMS) in a preferred embodiment of the present invention.

The work on the prototype has been extended to include other technologies such as HDSL and Frame Relay. That is, the Umbrella Management Systems is not limited to any particular type of network connections. In a suitable implementation, the A to Z connection is ATM over xDSL. FIG. 1 illustrates the elements and the element managers, in the UMS used for the prototype.

As best shown in FIG. 1, UMS hardware is generally indicated at 10 with the UMS itself indicated at 12. A network cloud 14 illustrates the interconnection of network hardware 16, 18, 20, 22 from various venders. That is, each network hardware block represents a set of network elements having a particular type, where the element types are different in the different hardware blocks. As such, as-is, each network hardware element set 16, 18, 20, 22 is programmed by interfacing with an associated element manager 46, 48, 50, 52, respectively. In accordance with the present invention, UMS 12 is operative to interface with the various element managers 46, 48, 50, 52, by using the information manager and the configuration manager of the UMS, to program elements in the various groups of different network hardware 16, 18, 20, 22. Network hardware blocks 16, 18, 20, 22, may also be referred to as subnets. UMS 12 allows the provisioning of a network connection from an end user 24, 26, 28 to any of various interfaces 30, 32, 34, 36 (which may vary in type, for example, ADSL, HDSL, Frame Relay, etc.).

The following section discusses the analysis of the software developed for each of the four (4) element managers (for the prototype) used to control the exemplary network hardware which, includes the Catalyst 5000, Newbridge 36170, Cascade 9000, and the Cisco 7200. In addition, some graphical user interface (GUI) analysis is presented. The Network Management Layer (NML) analysis includes the Configuration Manager (NMLcm) and the Information Manager (NMLim). Of course, the elements and element managers in the prototype are exemplary.

In accordance with the present invention, a generic functional and information model can be instantiated into specific examples, such as a Catalyst 5500, Ascend 4004, or BANC 6000, or any other type of network hardware. The major goal of developing a generic set of models of the present invention is so that different manufacturer's nodal processors and other network hardware can be inserted into the network with minimal changes to the software which controls (for example, provisioning, performance, fault) the device.

A nodal processor or a set of nodal processors can be used in conjunction with other network elements to provide a service. The information model developed defines a functional model for providing an end-to-end service. For example, in the case of DSL, a set of nodal processors in conjunction with Frame Relay, and/or ATM could provide an Internet service provider (ISP) connection for customers. The major goal of the invention is to map the Frame Relay and/or ATM and/or other switches, and nodal processors and other network hardware into a vendor independent network-level topology. Once this is accomplished, a functional model allows a DSL link and DSL path to be defined. A DSL path defines an "A" endpoint and a "Z" endpoint. The "A" endpoint could be an ATM interface, and the "Z" endpoint a DSL interface. Of course, the A to Z path is not limited to any particular interface types of the path ends. Provisioning menus presented to the user (or performed automatically based on developed rules) allow the optioning of such parameters as ATM Peak Cell Rate (PCR), Sustainable Cell Rate (SCR), and Maximum Burst Size (MBS), in an ATM/DSL implementation.

The nodal processor is architect as a device which allows many different kinds of premises LAN traffic to be transported over a variety of WAN transport mechanisms. In accordance with the development of the prototype, the specifications and requirements of a generic nodal processor are analyzed, and object-oriented concepts, are used to model the architecture of a nodal processor.

Figure 2:
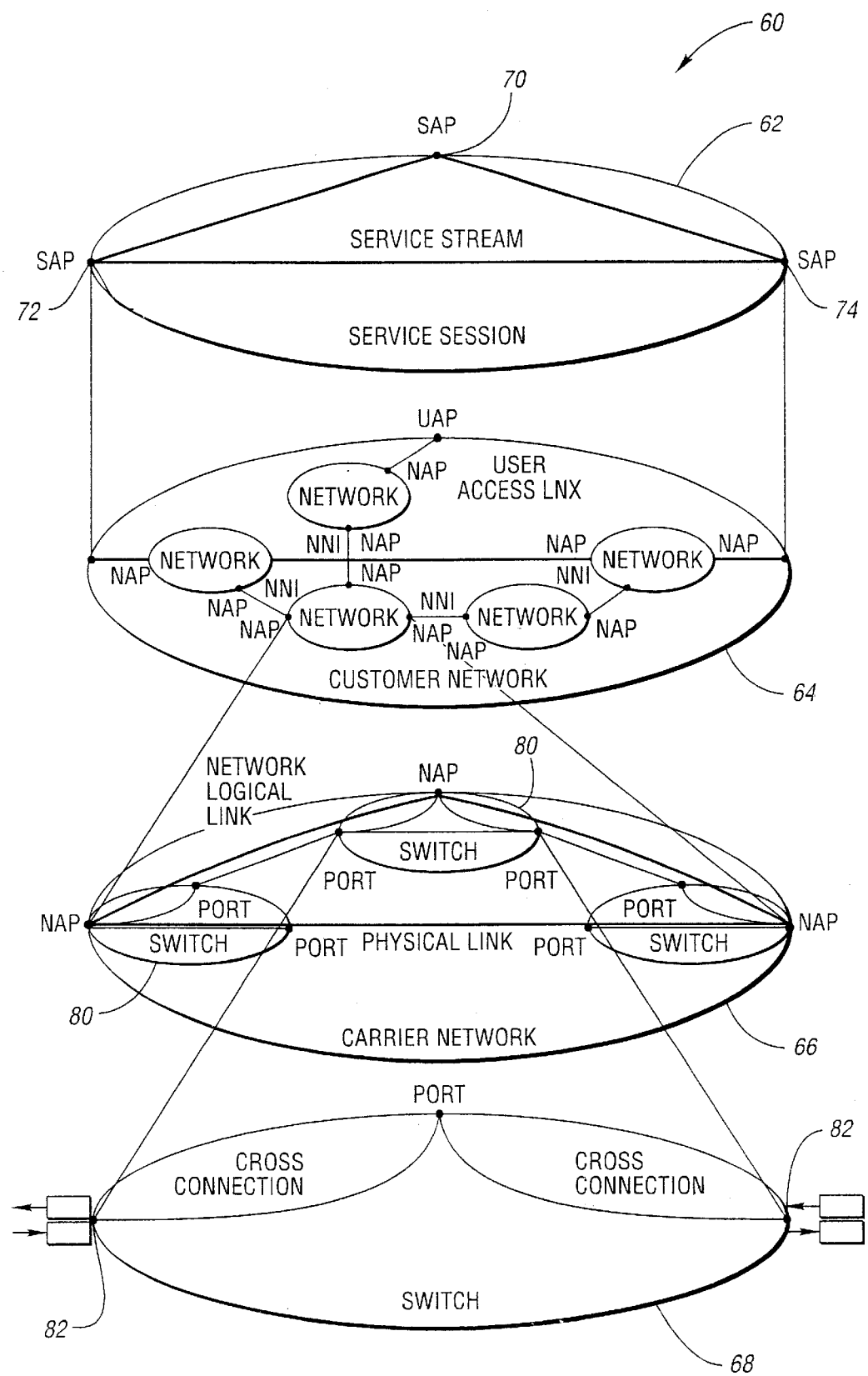
FIG. 2 shows the functional/informational architecture of the UMS.

As best shown in FIG. 2, the responsibility of the Configuration Manager (CM or NMLcm) is to take requests from the Service Management Level (SML), communicate with the Information Manager (IM or NMLim) to determine whether the request can be met, and then communicate with the individual Element Managers to request connections.

Functional architecture generally indicated at 60 includes the following layers: service session layer 62, customer network layer 64, carrier network layer 66, switch or element layer 68. At service session layer 62, various service access points 70, 72, 74 are available for selection. In the example, first and second service access points 72 and 74, respectively, are selected to provide a customer with a connection to an Internet service provider (ISP). At customer network layer 64, the route over the network is made up of various links, crossing various subnets 76. For each subnet, various network hardware such as switches 80 provide the path across the subnet. That is, the different subnets may have different types of elements (from different hardware manufacturers). And at the element level, each switch is made up of cross connections between ports 82 of the switch. It is believed that through object-oriented techniques that an information and functional architecture can be constructed in accordance with the present invention which can support more than ATM networks. Specifically, UAP (User Access Points) can be HDSL, Frame Relay, ATM, ISDN, etc.

The routing function performed at the Network Management Layer (NML) can best be described in a preferred embodiment by the NMLcm transmitting a route request to the NMLim. The route returned by the NMLim may be in the form of an object which potentially could be a link list which is represented by a user logical link composed of a series of network logical links connected by network-to-network links, the series beginning with an originating link and ending with a terminating link.

The NMLcm interprets the returned route and constructs and transmits nllCreate requests with NAP (Network Access Points) as attributes to the proper element managers. That is, access points are passed to the appropriate element manager and a network logic link is requested. To allow the request to take place, a vendor independent topology engine has been developed. In addition, the ability for the NMLcm to auto discover the element managers is preferred.

Once the element managers receive the nllCreate request, each performs a translation across its domain which will return the cross connections and physical links required to satisfy their domain.

The responsibility of the Information Manager (IM) is to maintain (create and update) the vendor independent topology of the network level view. The topology which must be maintained includes path connections as shown in FIG. 3. The Path connections (for example, DSL path 102), which for this exemplary design are called xDSL path connections, each include a series of cross connects 112 and Virtual Circuit Links (VCLs) 110 to define a virtual circuit connection (VCC) 108 between nodal processors 104.

The cross connects, by definition, connect two ports within one element and have a unique identifier. The VCL connects two ports from two elements and is locally uniquely defined by an address (VPI/VCI for ATM) or VLAN or equivalent identifier. The Information Manager (IM) should be able to perform a path trace which is the identification of each cross connect, and VCL, end-to-end (in the example).

A request from the Configuration Manager (CM) is for a route to connect two xDSL UAP (User Access Points). The returned information from the IM to the CM should be a DTL (Destination Transit List) which is (for example) a linked-list as shown in FIG. 4. The list includes VLAN identifiers 122, 124 at its ends. Along the list, port assignments for each switch (for example, port identifiers 126, 128) and virtual path (for example, VPI/VCI 130) are indicated. The linked-list identifies each cross connect and VCL for the end-to-end xDSL Path. Each cross connect entry in the linked-link should contain the following information: Equipment Identifier, Shelf Identifier, Slot Identifier, Port Identifier for both ports to which the cross connect should be made and the VPI/VCI values for both ports. Of course, as mentioned previously, embodiments of the present invention are not limited to a particular type of network connection, and ATM over DSL (and other DSL approaches such as Frame Relay/DSL) is just an example. Further, the terminology used to illustrate the example (VPI/VCI, VCL, VCC, etc.) is exemplary terminology appropriate for the example and is not meant to be limiting.

The user interface in an exemplary implementation may be in a browser executable format such as JAVA. The aim of writing the user interface in JAVA is to enable the use of the applet from any web browser. The preferred user interface includes two unique Thread modules. The first module records user input and updates the graphical user interface (GUI). The second module communicates with the Umbrella Management System (UMS) and invokes methods of the first module to update the interface display. In a UNIX environment, the second module may be a UMS daemon. Of course, those skilled in the art appreciate there are many ways to implement multiple threads and/or multiple processes, and that the module examples above are not meant to be limiting.

When the Java applet is started in a browser, both the main thread and the communications thread may be started automatically, or the two modules may be started manually. As shown in FIG. 5, the communications thread opens a socket 138 to the UMS 140 for the passing of data to/from GUI 142. At this point, method calls may be sent between the GUI and the UMS (FIG. 6, generally indicated at 150). The Java applet preferably provides more than just a user interface. For the purpose of this prototype, the GUI provides a topology view of the network at several different layers of abstraction. As best shown in FIG. 7, the GUI shows the Service Management Layer 172, the Network Management Layer 174, and the Element Layer 176 of the UMS. A preferred embodiment of a graphical user interface is shown in greater detail in FIGS. 20–28, described later herein, but briefly referenced immediately below.

Figure 23:
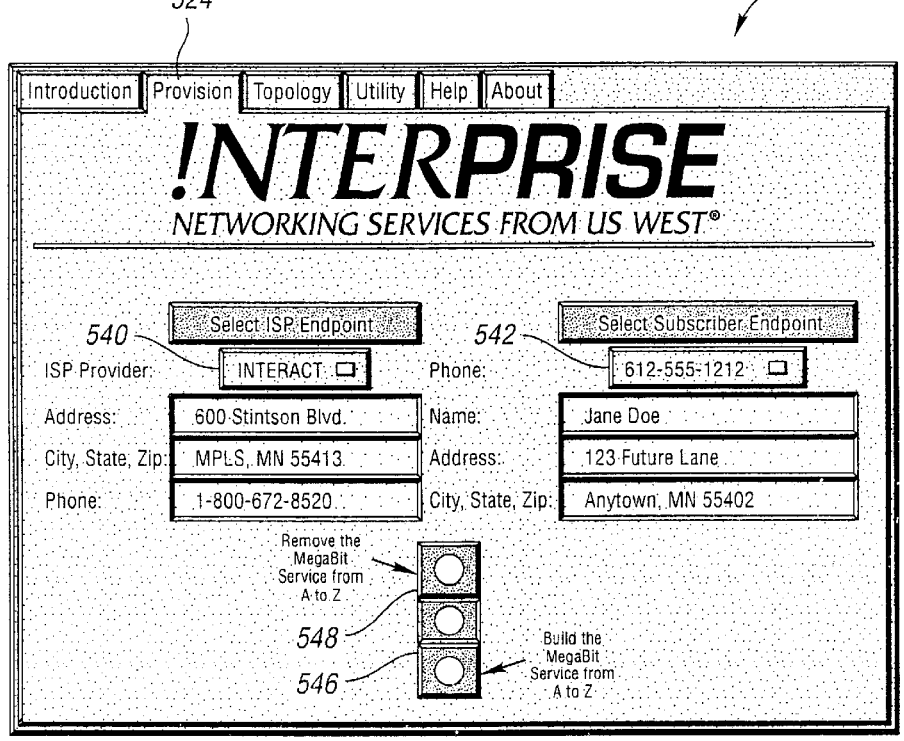
FIG. 23 is a screen display depicting the provisioning tool, with the provision tab in front, illustrating the selection of A and Z end points.
Figure 24:
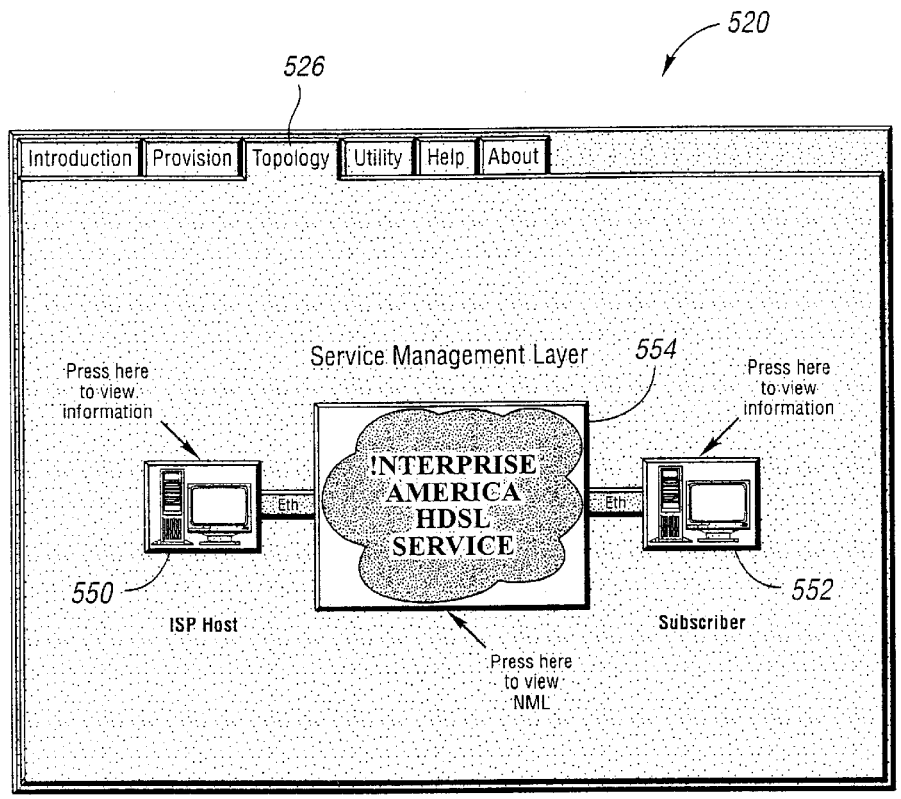
FIG. 24 is a screen display depicting the provisioning tool, with the topology tab in front, illustrating the Service Management Layer view of the A to Z connection.
Figure 25:
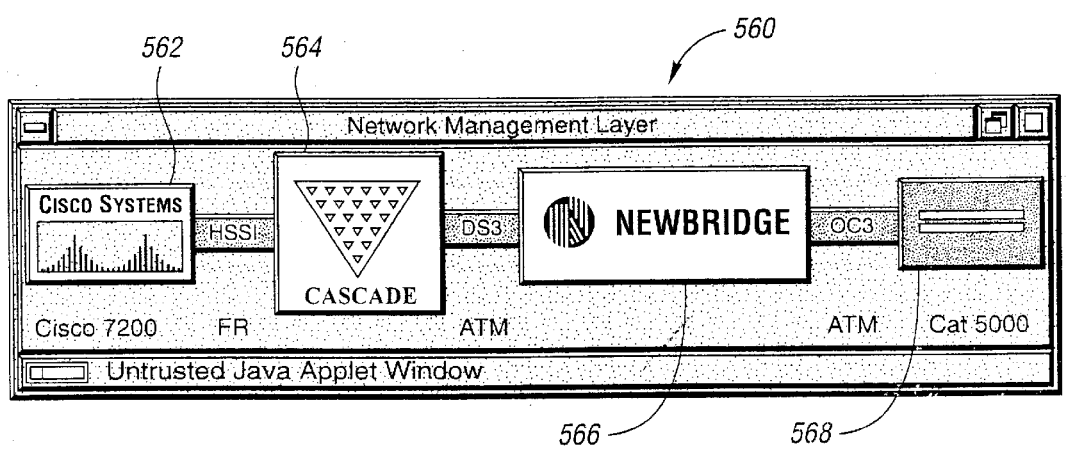
FIG. 25 is a screen display depicting the Network Management Layer (NML) for the prototype implementation.
Figure 26:
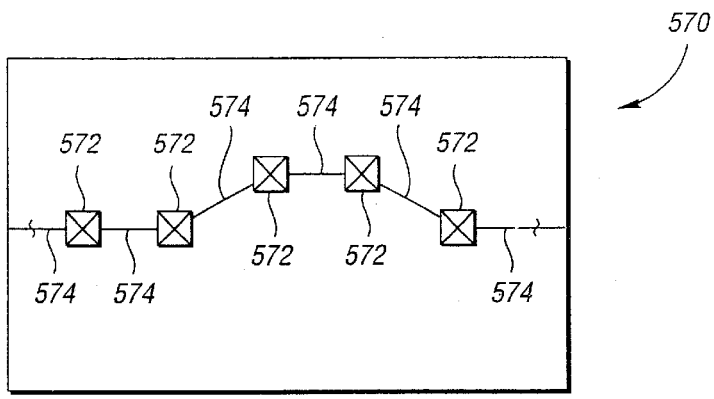
FIG. 26 is a screen display depicting the cross connects and physical links for a subnet shown in FIG. 25.
Figure 27:
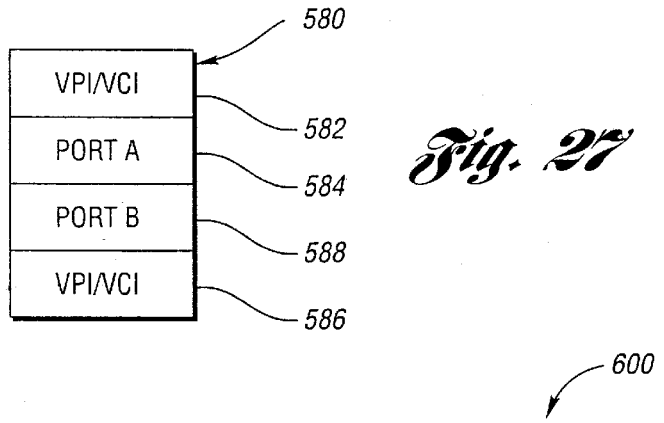
FIG. 27 is a screen display depicting the provisioning information for a cross connect.

At the Service Management Layer (SML), shown in FIG. 24, only the Service Access Points (SAPs) need to be specified. For the purpose of this prototype, each SAP is identified by a subscriber phone number or the name of an Internet Service Provider (ISP), as shown in FIG. 23. At the Network Management Layer (NML), each icon represents a cloud of nodes managed by each vendor's network manager (FIG. 25). Finally, at the Element Layer, the GUI displays the actual cross-connects that are provisioned on each node (FIG. 26). The GUI preferably is further operative to display actual provisioning information, as shown in FIG. 27.

The purpose of the UMS class is to handle the communication between the SML and the NML. At startup, the UMS first creates an instance of the NMLcm and initializes it, which in turn goes and creates the necessary EMLcms and its NMLim. Once the NMLcm and its associated EMLcms are initialized, the UMS waits for a TCP socket connection from an SML application. A protocol on top of TCP/IP called apcon, which is an ASCII, message-based protocol, was developed for embodiments of the present invention. This type of protocol was chosen, although others may be suitable, for a number of reasons:

1. ASCII based: Using an ASCII protocol makes debugging and testing the SML/NML commnunication much easier. Instead of encoding structures, the UMS can just pass strings between the two layers. For testing, a user can monitor the messages crossing the network by using a network analyzer. Also, by using the Telnet protocol, a user can test the UMS independently of the SML. In the future implementations, the inventors anticipate that, an object based protocol, such as CORBA, would likely be used.

2. Message based: The protocol itself is made up of messages, each consisting of a command and zero or more parameters. These commands translate directly to methods the UMS executes, either on itself (such as shutdown), or on the NMLcm (such as createService).

The UMS utilizes the Socket and Command classes for communicating with the SML. The Socket class is used to create a TCP server socket which waits for a connection from the SML. It also performs the reading and writing of data to the SML socket. The data read from or written to the SML socket is encapsulated in a Command object. The UMS calls the Socket waitForCommand method to read a command from the SML. The waitForCommand method reads from the socket and is expecting a string in the following format:

command(<parameters>)

waitForCommand reads this string and stores it in a Command object, which holds the command name and each parameter. This object is passed back from waitForCommand to the UMS. The UMS performs a switch statement on the command name.

In this exemplary implementation for the prototype, the commands understood are:

1. createService: The UMS will call the NMLcm ullCreate method with the arguments from the SML.

2. deleteService: The UMS will call the NMLcm ullDelete method.

3. playMovie: The UMS will execute a movie player. It expects the argument from the SML to contain the name of the movie file that should be played.

4. shutdown: This causes the UMS to run its shutdown method. This in turn calls the NMLcm shutdown method, then deletes the NMLcm and SML connection. The UMS then returns to the main routine, which then exits.

The UMS can also realize when the SML connection fails and recover. In the waitForCommand method call, if the socket is broken, waitForCommand will set the initialized flag of the socket to FALSE. The UMS can check this flag, and if it is found to be false, it deletes the old SML socket and creates a new one, which will wait for another connection. The underlying NMLcm and EMLcms are not affected. The inheritance and association diagram for the UMS system as a whole is shown in FIG. 8, generally indicated at 180.

Figure 8:
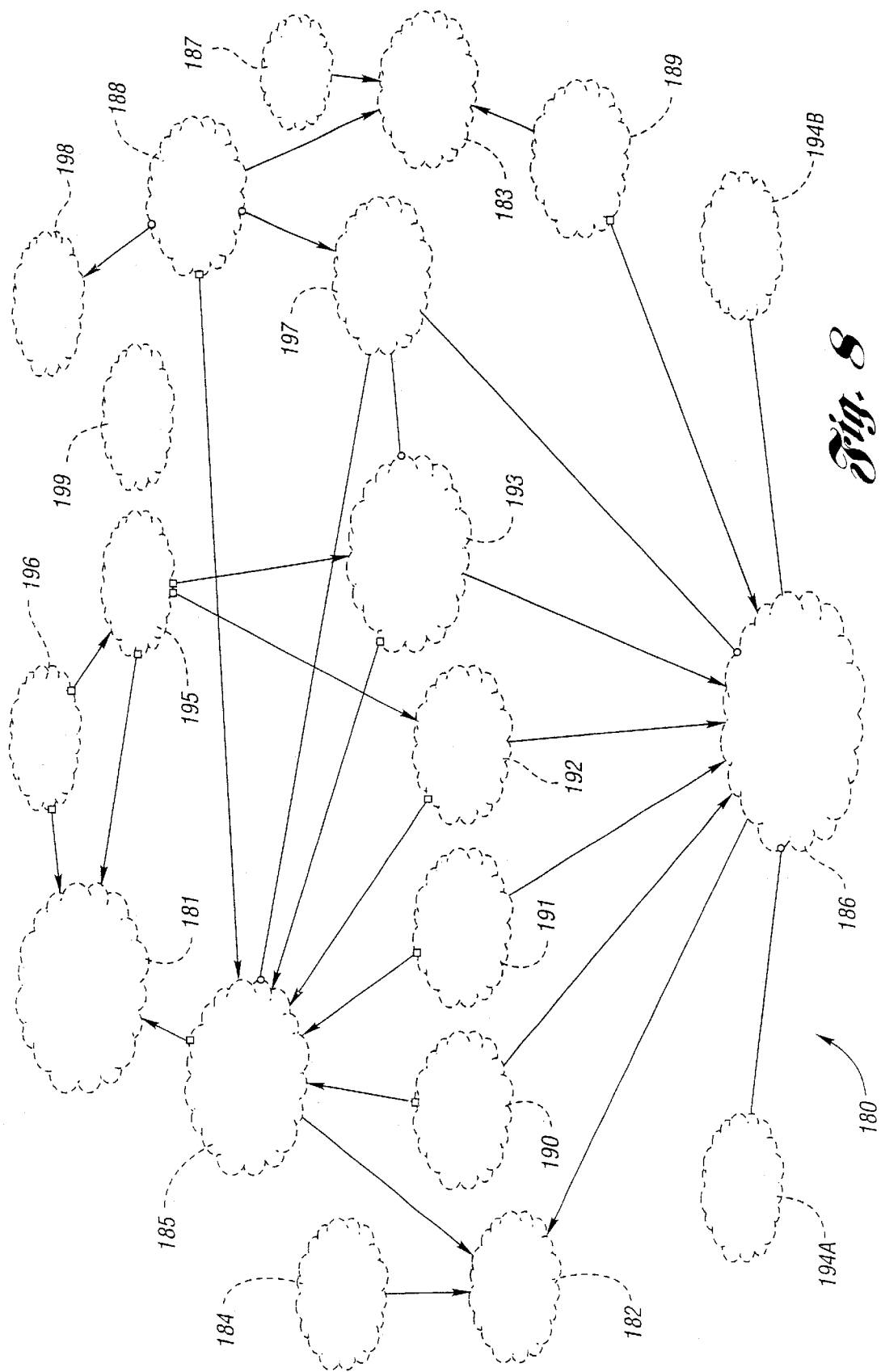
FIG. 8 shows the inheritance and association diagram for the UMS.

In FIG. 8, the UMS is indicated at 181, with the left hand side of the diagram generally showing the configuration manager logic and the right hand side of the diagram generally showing the information manager logic. Configuration manager 182, preferably, spans multiple layers. As shown, in the prototype implementation, service management layer configuration manger (SMLcm) 184 and network management layer configuration manager (NMLcm) 185 communicate with configuration manager logic 182. Further, preferably, information manager logic 183 spans several layers. Service management layers information manager (SMLim) 187 and network management layer information manager (NMLim) 188 communicate with information manager logic 183. The element management layer configuration manager (EMLcm) is indicated at 186; while the element management layer information manager (EMLim) in indicated at 189. The actual configuring is done by the EMLcm 186, to provide communication between, for example, termination point 194a and network access point 194b. As shown, the various element managers (for the various hardware platform developments) are indicated at 190, 191, 192, 193.

As explained elsewhere herein, UMS 181 affects control of element manager 190, 191, 192, 193 with various communications involving configuration manager logic 182, information manger logic 183, and the associated cm and im components at the various levels. As necessary, the element managers may use various specific techniques suited for the particular hardware platform, as needed, such as, for example, socket 195 and result cloud 197. Socket 195 allows direct communication with UMS 181 of command 196, when required. Further, in accordance with the functionality described previously, network management logic information manger (NMLim) 188 has access to user logical link routing information at cloud 198, and a log 199 may be used to track operation of UMS 181.

Figure 9:
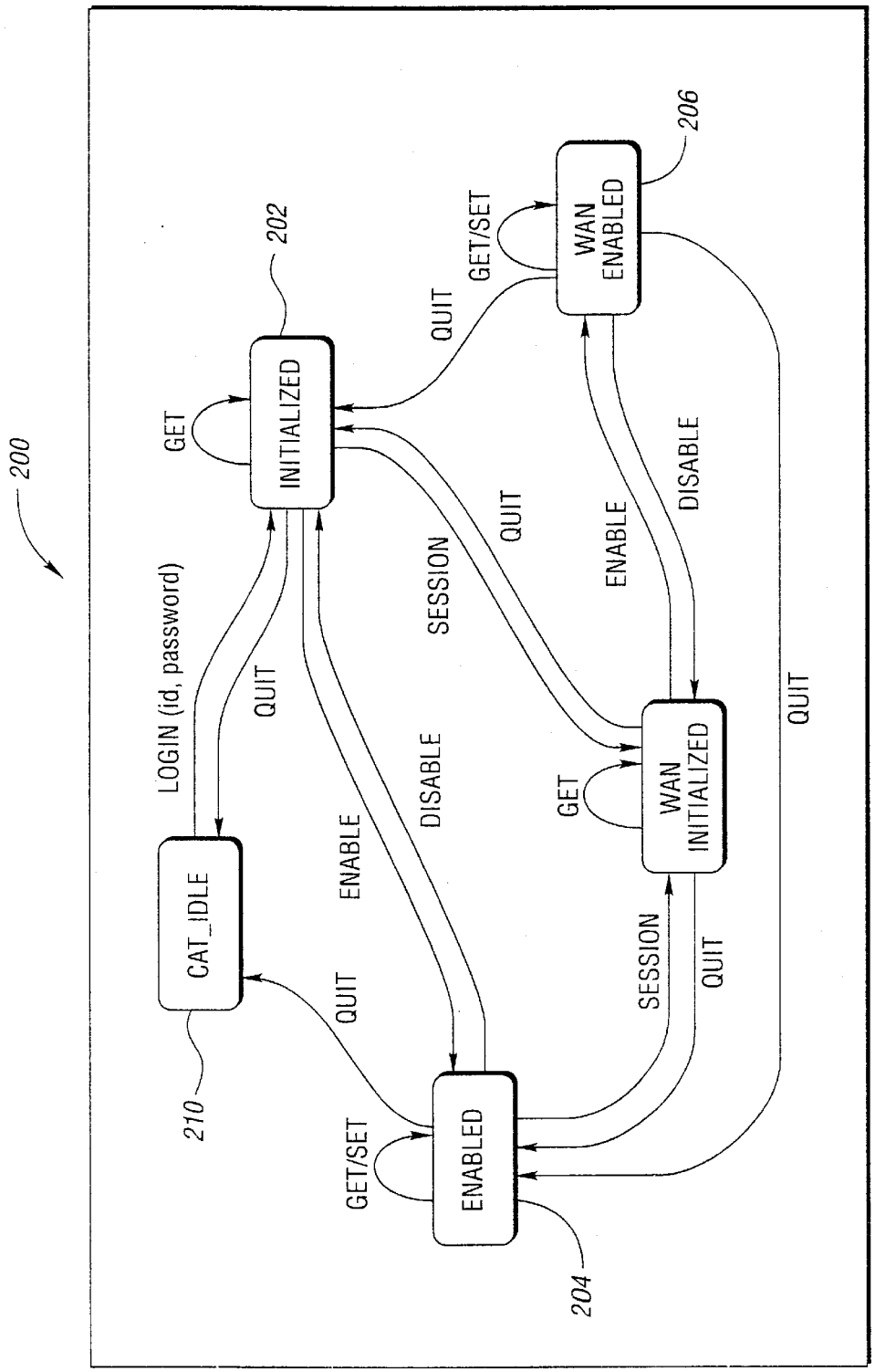
FIG. 9 shows the state machine for the Catalyst 5000 configuration in a prototype UMS.

In the prototype, the Catalyst 5000 element manager class (CatEM) uses a state variable to track what state the element is in. As best shown in FIG. 9 at 200, the states include: Initialized 202, Enabled 204, Enabled 206, WAN-Initialized 208, and idle 210. These states map to the different modes the element can be in. For instance, to configure an ATM card, the element manager must enter an ATM session mode and then config mode.

The methods in this class are divided into those that deal with state (control methods) and those that do not (operation methods). The control methods, such as initialize, shutdown, xconCreate and xcondelete, verify the element is in the proper state before executing any commands on the element. They modify and maintain the state as the commands progress. The operation methods are more of the low-level methods, and assume that the element is already in the proper state. This allows for only a small number of methods to be concerned about the state of the element, and operation methods to only be concerned with their specific task. Here is a brief listing of the operation methods and their purpose:

| | |
|---|---|
| createVlan | Creates a Vlan, associating it with a specific Ethernet port |
| portEnable | Enables a port after the Vlan has been created |
| createATMPvc | Creates an ATM PVC within the ATM card |
| bindAtmVlan | Binds a VLAN to an ATM PVC within the ATM card |
| unbindAtmVlan | Unbinds a VLAN from an ATM PVC |
| deleteAtmPvc | Deletes an ATM PVC |
| deleteVlan | Deletes a Vlan |
| enable | Puts the element into enabled mode (i.e., write mode) |
| session | Puts the element into a session mode with an ATM card |
| sessionEnable | Puts the element into a session enabled mode (i.e. write mode for ATM) |
| sessionConfig | Puts the element into configuration mode for the ATM card |
| sessionEndConfig | Exits the ATM card configuration mode |
| sessionDisable | Disables write mode for the ATM card |
| sessionQuit | Takes the element back out of session mode |
| disable | Disables write mode of the element |

Communication with a Catalyst 5000 is performed with a TCP/IP client socket supported by the Socket class. The Socket class uses the sendRequest method to communicate with the element. sendRequest takes two arguments. The first is a string that is sent to the element. The second is the expected response from the element. sendRequest sends the first string and reads from the socket until it receives a response. If the response is not what is expected, it will return an error condition which the element manager can then act upon. Otherwise, it returns a successful condition.

In the prototype, the configuration of the Newbridge 36170 is performed by using the Newbridge 46020, Newbridge ConnectExec, and DSET products. The 46020 connects to the 36170 via an Ethernet connection running a proprietary protocol CPSS. The ConnectExec software provides a CMIP interface to the DSET package and a proprietary interface to the 46020. The DSET package provides a set of C++ synchronous interface calls which will create/configure and delete ATM PVCs. The supported functions provided by DSET are DSET_init( ), DSET_shutdown, createGroomedCircuit( ), setGroomedCircuit, and deleteGroomedCircuit.

The configuration of the 36170 was performed for the prototype using a set of C++ synchronous system calls provided by DSET which are compiled and linked into the UMS code via object files. The NMLcm within the UMS instantiates a NB46020EM (element manager for Newbridge networks). The initialization process is started by the NMLcm, where upon the NB46020EM establishes communication with the DSET agent via a C++ system call.

The NB46020EM initialize method is invoked by the NMLcm and will make a DSET_init( ) call to the DSET agent which will establish a CMIP association with the ConnectExec agent. The ConnectExec agent communicates with the 46020 via a proprietary mechanism. Once the association is performed, connect and disconnect requests can be received from the SML.

The SML will send service requests down to the UMS (NMLcm), where upon the NMLcm (after conferring with the NMLim) will transmit the proper nllCreate messages to the EMLcms. In the case of the NB46020EM, the nllCreate message will be mapped to the proper xconCreate message.

For a connection request, the xconCreate method will first verify that the route requested does not already exist. If the route does not exist, then a createGroomedCircuit, and setGroomedCircuit commands are sent. A similar procedure is followed for service deletion requests. The SML will send a service disconnect request down to the UMS (NMLcm), where upon the NMLcm (after conferring with the NMLim) will transmit the proper nllDelete messages to the EMLcms. In the case of the NB46020EM, the nllDelete message will be mapped to the proper xcondelete message. The xconDelete method will transmit a deleteGroomedCircuit. The route table is updated by setting the route condition to −1 (no route). A persistent store is required which maps routes to TrailIds. Two methods exist to update and read the persistent store: NB46020EM::xconGetRoute( ) and NB46020EM::xconSetRoute.

In the prototype, the hardware configuration and control of the Newbridge network consists of the following. The 46020 and ConnectExec software are loaded on one SPARCstation. The DSET software and UMS software reside on a second SPARCstation. The DSET software and ConnectExec communicate using CMOT (CMIP over TCP/IP).

The configuration of the Cascade 9000 is performed by using the Cascade C++ Provisioning server and client mechanism. The CascadeView/Sybase system connects to the Cascade 9000 via an Ethernet connection. The CascadeView/Sybase machine also is running the Provisioning Server software which uses a TCP/IP communication to the client-side software which is integrated as part of the prototype UMS software package.

The NMLcm within the UMS instantiates a CascEM (element manager communication with Cascade Provisioning Server). The initialization occurs and the CascEM initiates a session to the Cascade Provisioning Server. The initialization will place the Cascade Provisioning Server into the mode of operation and ready to accept any configuration commands.

The SML will send service requests down to the UMS (NMLcm), where upon the NMLcm (after conferring with the NMLim) will transmit the proper nllCreate messages to the EMLcms. In the case of the CascEM, the nllCreate message will be mapped to the proper xconCreate message. The xconCreate method will transmit the proper commands to the Cascade Provisioning Server. Based on the selected route, a Frame Relay/ATM Service Interworking PVC is constructed as an object and stored in the Cascade 9000 and Sybase database. The PVC parameters are set for CIR=768 kbps, Bc=768 k, and Be=0.

A similar procedure is followed for service deletion requests. The SML will send a service disconnect request down to the UMS (NMLcm), whereupon the NMLcm (after conferring with the NMLim) will transmit the proper nllDelete messages to the EMLcms. In the case of the CascEM, the nllDelete message will be mapped to the proper xcondelete message. The xconDelete method will delete the Frame Relay/ATM Service Interworking PVC from the Cascade 9000 and the Sybase database. The CascEM supports a shutdown method, which will close the session with the Cascade Provisioning Server.

The configuration of the Cisco 7200 was performed using an element manager developed for the present invention. The element manager in production would most likely be software such as CiscoWorks. The NMLcm within the UMS instantiates a Cisco7200EM (element manager for Cisco7200). The initialization occurs and the Cisco7200EM initiates a Telnet session to the Cisco7200. The initialization will place the Cisco 7200 into the EXEC mode of operation and ready to accept any configuration commands.

The SML will send service requests down to the UMS (NMLcm), whereupon the NMLcm (after conferring with the NMLim) will transmit the proper nllCreate messages to the EMLcms. In the case of the Cisco 7200, the nllCreate message will be mapped to the proper xconCreate message. The xconCreate method will transmit the proper commands to the Cisco 7200 via the Telnet connection.

A similar procedure is followed for service deletion requests. The SML will send a service disconnect request down to the UMS (NMLcm), whereupon the NMLcm (after conferring with the NMLim) will transmit the proper nllDelete messages to the EMLcms. In the case of the Cisco7200, the nllDelete message will be mapped to the proper xconDelete message. The xconDelete method will transmit the proper command sequence to the Cisco 7200 via the Telnet connection. The Cisco7200EM supports a shutdown method, which will disconnect the Telnet session with the Cisco 7200.

The prototype configuration required the Cisco 7200 to be configured as a bridge. A single bridge group which connected Frame Relay PVCs to a single Ethernet port was configured ahead of time. The Cisco7200EM could have performed this function as part of the initialization process. The connect and disconnect requests mapped into adding and removing Frame Relay DLCI from the bridge group. The configuration of the Cisco 7200 is listed below.

Figure 10:
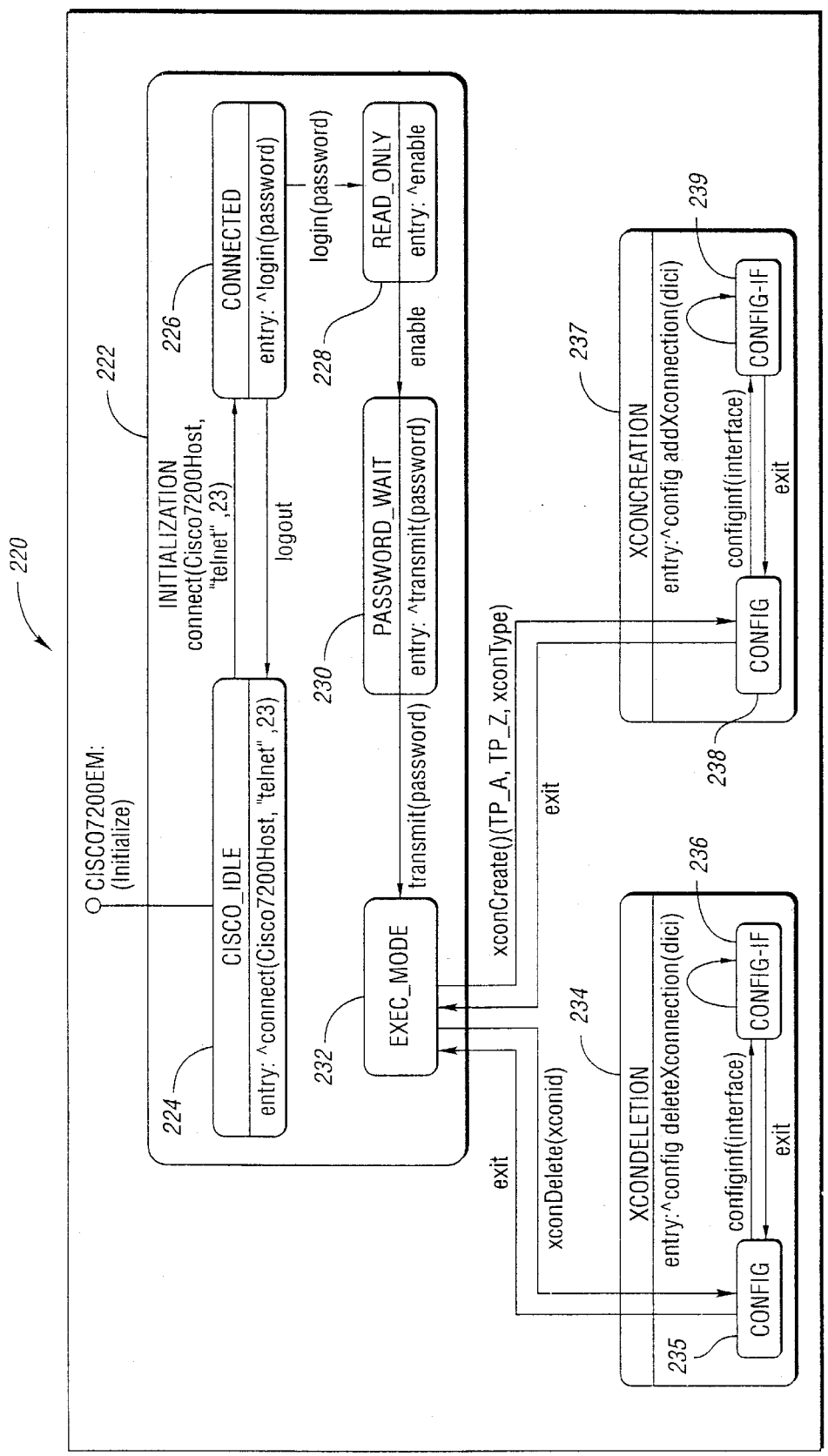
FIG. 10 shows the state machine for the Cisco 7200 configuration in a prototype UMS.

!
version 11.1
service udp-small-servers
service tcp-small-servers
!
hostname Renie
!
boot system flash slot0:c7200-j-mz.111-9.CA1.bin
enable password cisco
!
interface Hssi1/0
no ip address
encapsulation frame-relay IETF
no keepalive
fair-queue 64
frame-relay map bridge 101 broadcast IETF
frame-relay map bridge 102 broadcast IETF
frame-relay map bridge 103 broadcast IETF
!
interface Ethernet5/0
no ip address
bridge-group 1
!
interface Ethernet5/7
ip address 137.108.30.215 255.255.255.0
!
no ip classless
!
bridge crb
bridge 1 protocol ieee The state machine for the configuration of the Cisco 7200 element manger is shown in FIG. 10, at 220. The element manager includes initialization logic 222 and illustrates various states for the element manager including an idle state 224, a connected state 226, a read-only state 228, a password-wait state 230, and an exec-mode 232. Execution mode allows deletion of cross connections as shown at block 234 and creation of cross connections as shown at block 237. Cross connection deletion logic 234 includes configuration logic 235 and 236, while cross connection creation logic 237 includes configuration logic 238 and 239.

Figure 11:
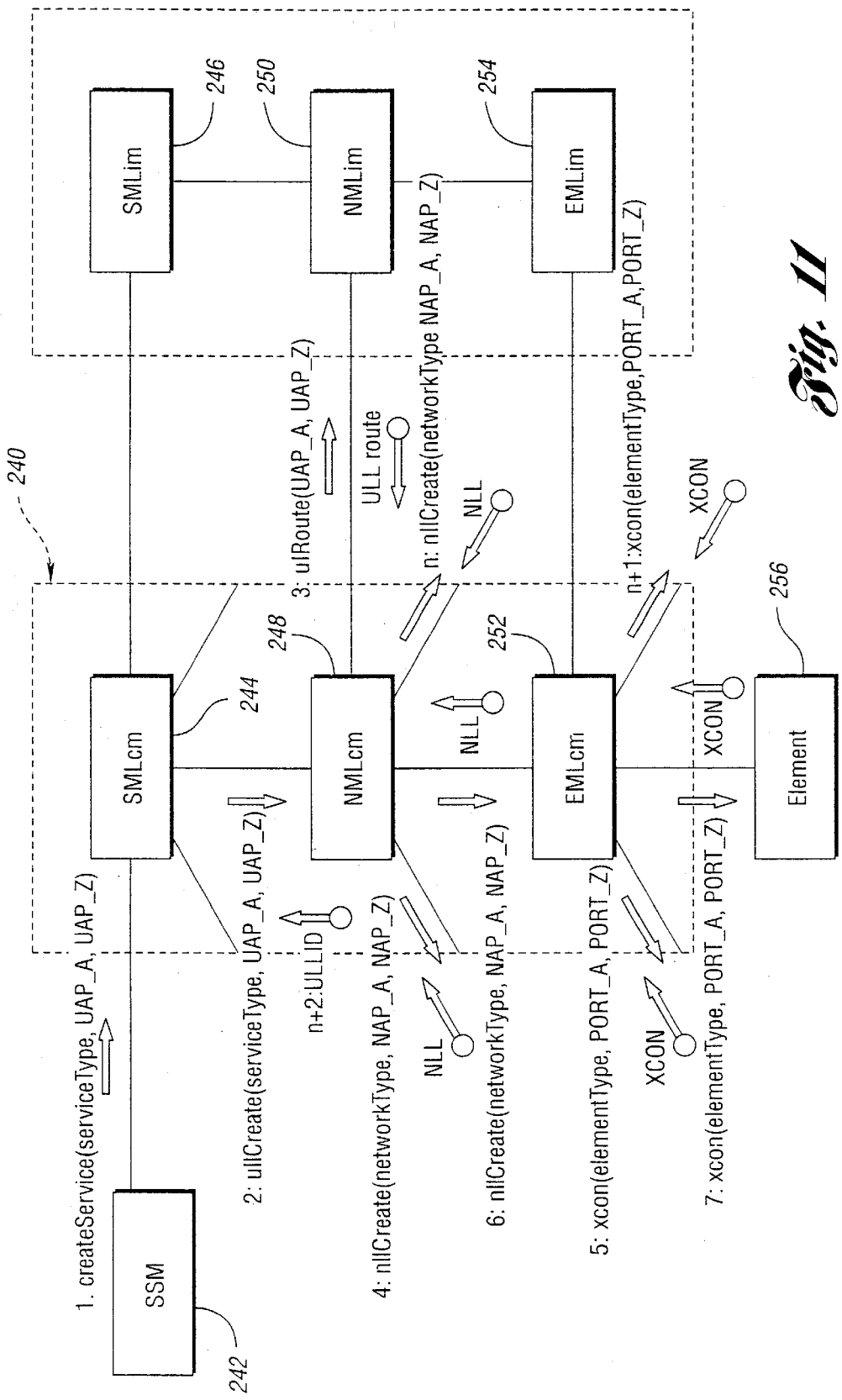
FIG. 11 shows the UMS functional architecture.

In FIG. 11, a block diagram illustrating the functional design of the prototype implementation of the present invention is generally indicated at 240. As shown, service session manager 242 is in communication with the service management layer. The service management layer includes a configuration manager (SMLcm) 244 and an information manager (SMLim) 246. UMS, in accordance with the present invention, provides communications between the service management layer and the lower layers. The network management layer has a configuration manager side (NMLcm) 248 and an information manager side (NMLim) 250. Below the network management layer, the element management layer has a configuration manager side (EMLcm) 252 and an information manager side (EMLim) 254. At the lowest level, the element manager layer communicates with the individual elements, as shown at block 256.

In operation, a network management system of the present invention, the UMS being a preferred implementation, configures a network connection between first and second service access points at the service management layer as follows. SSM 242 requests the creation of a service having a specified service type, between an A user access point and a Z user access point. In a prototype, the request is represented as follows:

1: create Service(serviceType,UAP_A,UAP_Z)

The request is received by the service management layer configuration manager (SMLcm) 244. A service management layer information manager (SMLim) 246 may perform some route analysis at the service management level, before the create Service request is passed to the network management layer in the form of a user logical link (ull or ULL) creation request. In the prototype, the ull creation request has the following format:

2: ullCreate (serviceType,UAP_A,UAP_Z)

The ull creation request is received by the network management layer configuration manager (NMLcm) 248. NMLcm 248 queries the network management layer information manager (NMLim) 250 to determine a logical route. In the prototype, the ull route request takes the following format:

3: ullRoute (UAP_A,UAP_Z)

NMLim 250 returns a ull route to NMLcm 248. Based on the returned route, NMLcm 248 begins to request network logical links. In the prototype, NMLcm 248 requests the first network logical link using the following request format:

4: nllCreate (networkType,NAP_A,NAP_Z)

Requests to create network logical links made by the network anagement layer configuration manager 248 are received at the element anagement layer. The element management layer includes element management layer configuration manager (EMLcm) 252 and element management layer information manager (EMLim) 254. In a preferred embodiment, NMLcm 248 communicates with an information manager that spans both the network management layer with NMLim 250 and the element management layer with EMLim 254 (in addition to, as shown the service management layer with SMLim 246). Of course, it is appreciated by those skilled in the art that communications between the configurations manager and the information manager may occur at and/or across various layers of the overall communication model. As such, the particular connections between the configuration manager and the information manager shown in FIG. 11 are not meant to be limiting, but are used to facilitate an understanding of the prototype embodiment of the present invention.

The route received from the information manager is made up of links over the network from the first point (the A point) to the second point (the Z point), preferably in accordance with the equations stated previously. A network to network link (nnl or NNL) connects a pair of subnets having elements of different types, and a network logical link (nll or NNL) provides a path across a subnet. The nll and nnl links are provided by NMLim 250. In a preferred embodiment, EMLim 254 provides more specific routing information, such as port and virtual circuit information. At the network management layer, configuration manager 248 requests the corresponding element management layer configuration manger 252 to program the subnet element 256 (at each subnet, with the appropriate element manager) in accordance with the routing information obtained from the information manager. In a prototype, EMLcm 252 responds to the network logical link creation request by requesting the creation of a cross connection in the following format:

5: xcon(elementType,PORT_A,PORT_B)

After EMLcm 252 completes the network logical link requested by NMLcm 248 by configuring the appropriate cross connections, the network logical link (NLL) information is returned to NMLcm 248. Creation of the network connection continues with the NMLcm 248 requesting a next network logical link (in the prototype) using the following format:

6: nllCreate(networkType,NAP_A,NAP_Z)

In response to this next logical link (NNL) creation request, EMLcm 252 (in accordance with information from EMLim 254 requests the creation of appropriate cross connects, and in the prototype, uses the following format:

7: xcon(elementType,PORT A,PORT_B)

The entire network connection is created in this fashion, with the NMLcm 248 continuing to request network logical links, with the last network logical link being requested in the following format (in the prototype):

n: nllCreate(networkType,NAP_A,NAP_Z)

In a similar fashion, EMLcm 252 continues to make cross connection creation request to elements 256, and in the prototype, the last cross connection creation request is made in the following format:

n+1: xcon(elementType, PORT_A,PORT_B)

Of course, it is to be understood that the various network logical links may each have any number of cross connections, and that the prototype configuration of network logical links using n+1 cross connections is nearly an example.

Figure 12:
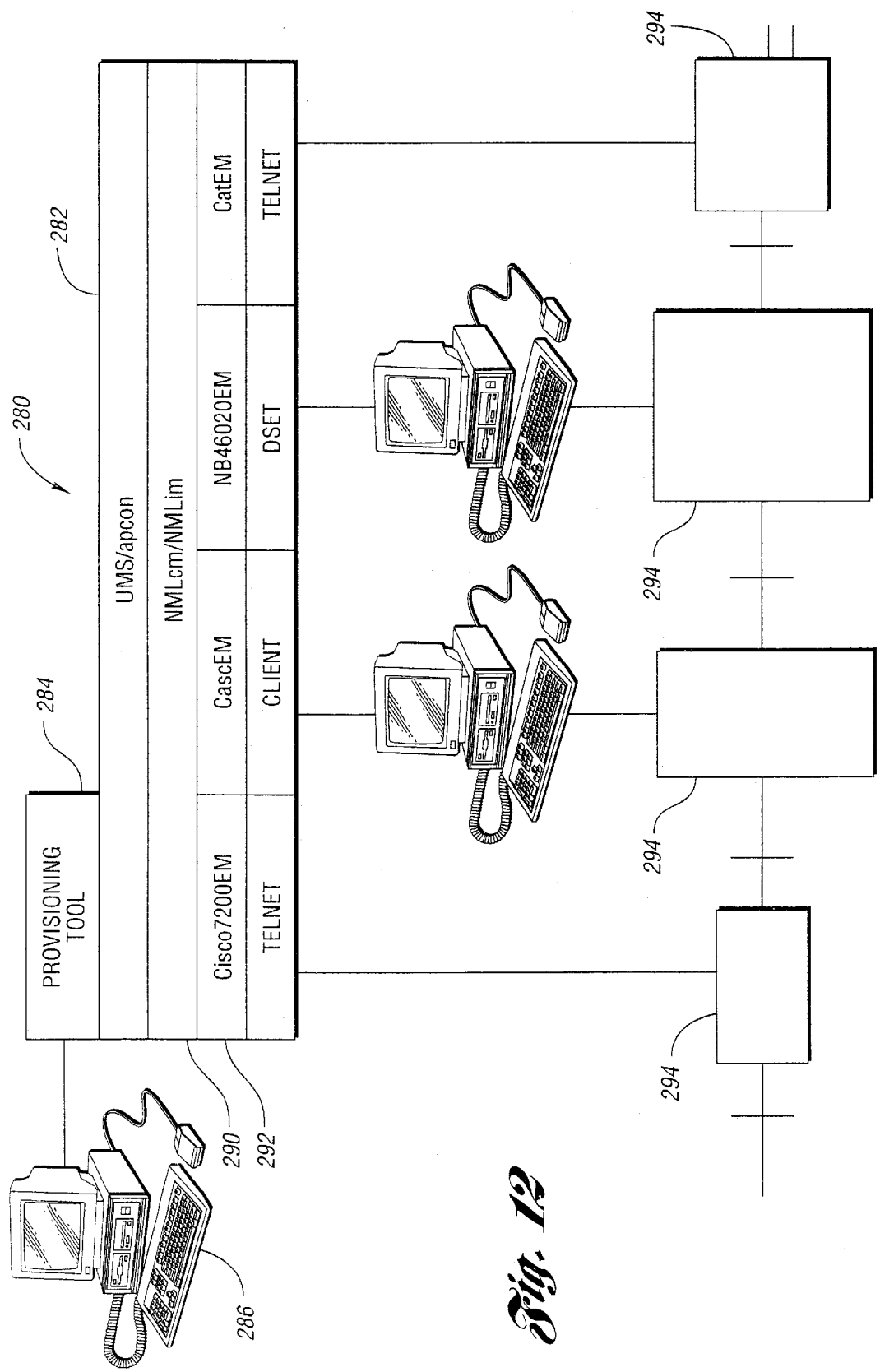
FIG. 12 depicts the communications design of the UMS in a prototype.

In FIG. 12, the communication design of the prototype UMS is generally indicated at 280. UMS 282 may be accessed through a variety of interfaces. In the example illustrated, a provisioning tool 284 is controlled through a workstation 286 to access UMS 282. Advantageously, workstation 286 may have a graphical user interface made in accordance with the present invention to facilitate access to UMS 282 by displaying the provisioning tool graphically. On the other hand, UMS 282 could receive signals from other devices, such as a service order processor, and so on, and is not particularly limited to receiving control commands through a graphical user interface (GUI). As shown, UMS 282 provides the interface to the network management layer 290, which includes a configuration manager and an information manager. As mentioned previously, preferably the information manager and the configuration manager have functionality extending to lower layers. In the prototype, the various element managers 292 access the various network elements 294 as described previously.

Figure 13:
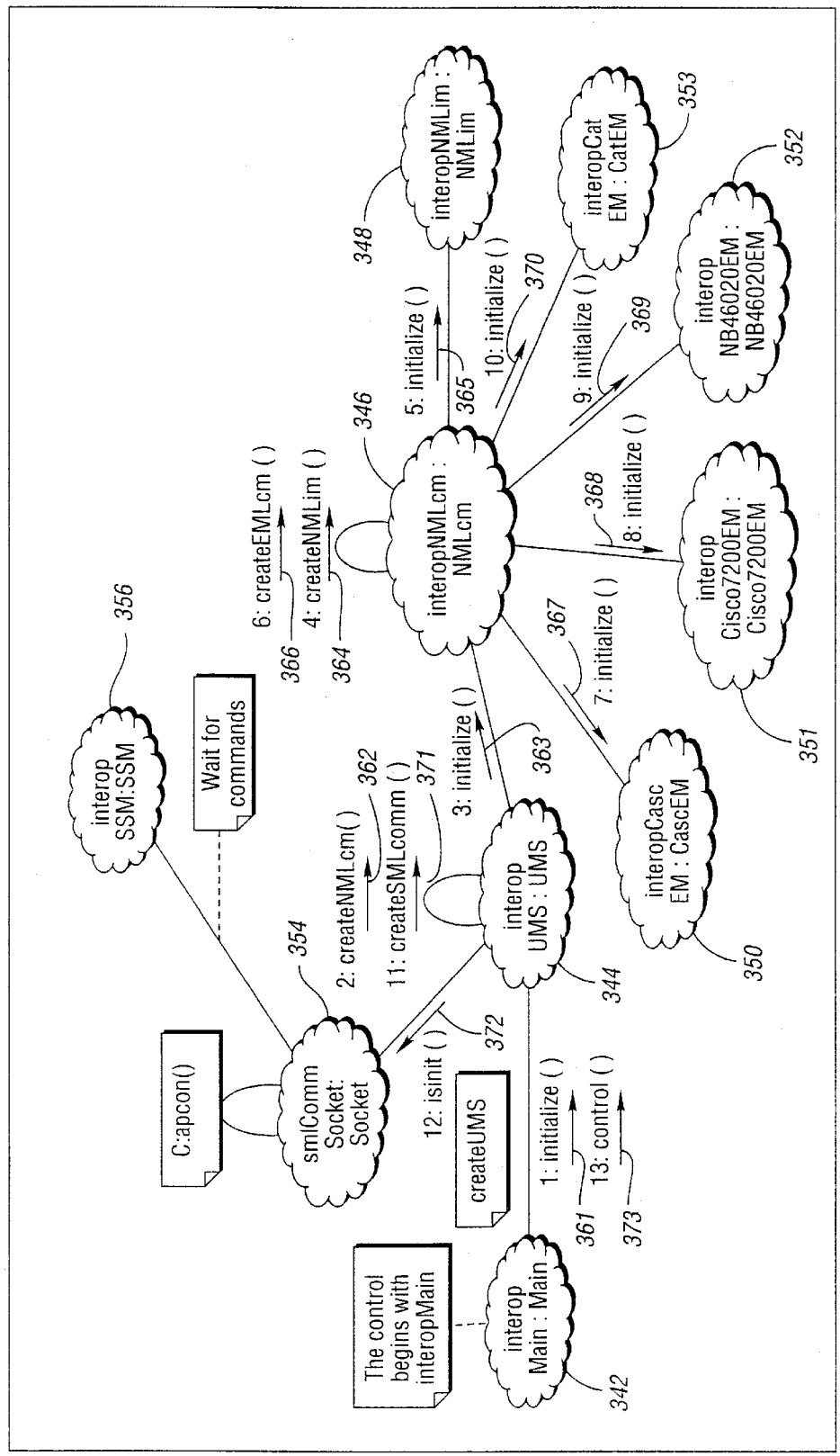
FIG. 13 shows an initialize object diagram.
Figure 14:
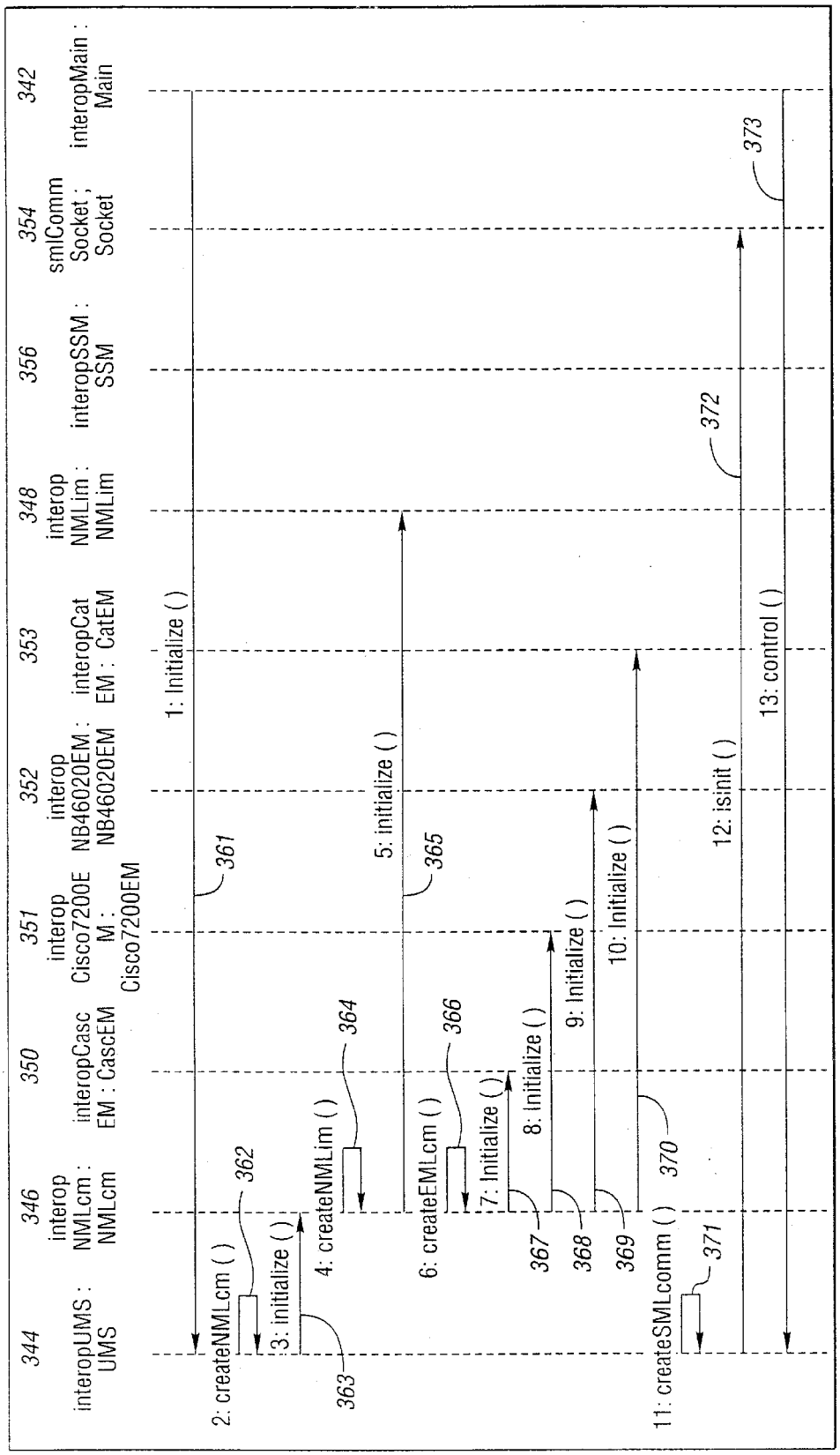
FIG. 14 shows an initialize message diagram.

To help better understand the prototype embodiment, several diagrams have been provided. FIG. 13 shows an initialize object diagram, showing the associated process flow during object initiation, with the flow diagram being generally indicated at 340. In FIG. 14, generally indicated at 360, is an initialize message diagram.

FIGS. 13 and 14 are best understood when viewed together in light of the below listed initialization process for the prototype.

In the prototype, initialization takes places as follows:

1: initialize( )—(361) A main process 342 makes a call to initialize UMS 344.

2: createNMLcm( )—(362)—The network management layer configuration manager (NMLcm) is created.

3: initialize ( )—(363) An instance of the NMLcm is initialized at 346.

4: create NMLim( )—(364) The network management layer information manager (NMLim) is created.

5: initialize ( )—(365) An instance of the NMLim is initialized at 348.

6: create EMLcm( )—(366) The element management layer configuration managers (EMLcms) are created.

7: initialize ( )—(367) An instance of the CaseEM element manager 350 is initialized.

8: initialize ( )—(368) An instance of the Cisco 7200EM element manager 351 is initialized.

9: initializer ( )—(369) An instance of the NB46020EM element manager 352 is initialized.

10: initializer ( )—(370) an instance of the CatEM element manager 353 is initialized.

11: create SML comm ( )—(371) Service Management Layer communication socket 354 is created.

12: isInit ( )—(372) Communication with service session manager (SSM) 356 is initialized.

13: Control ( )—(373) Main process 342 controls UMS 344.

Figure 15:
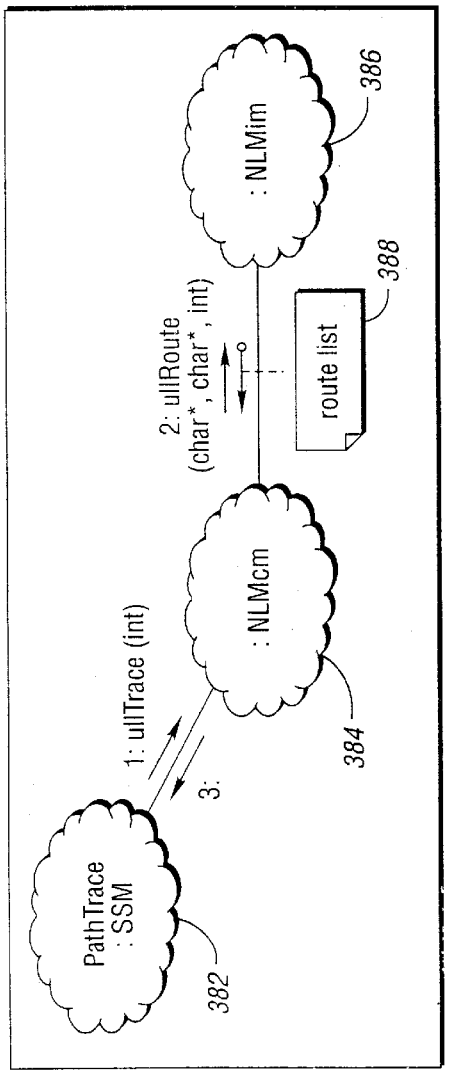
FIG. 15 shows a path trace object diagram.

In FIG. 15, generally indicated at 380, is a path trace object diagram. In the diagram, path trace object 382 at the SSM sends a request to the NMLcm 384, preferably (in the prototype) in the following format:

1: ullTrace(int)

NMLcm384, in response to the path trace request, passes a route query to NMLim 386. The route query is preferably (in the prototype) in the following format:

a:ull Route (char*,char*, int)

NMLim 386 returns the path as a route list 388, preferably in a link list format as described previously herein.

Figure 16:
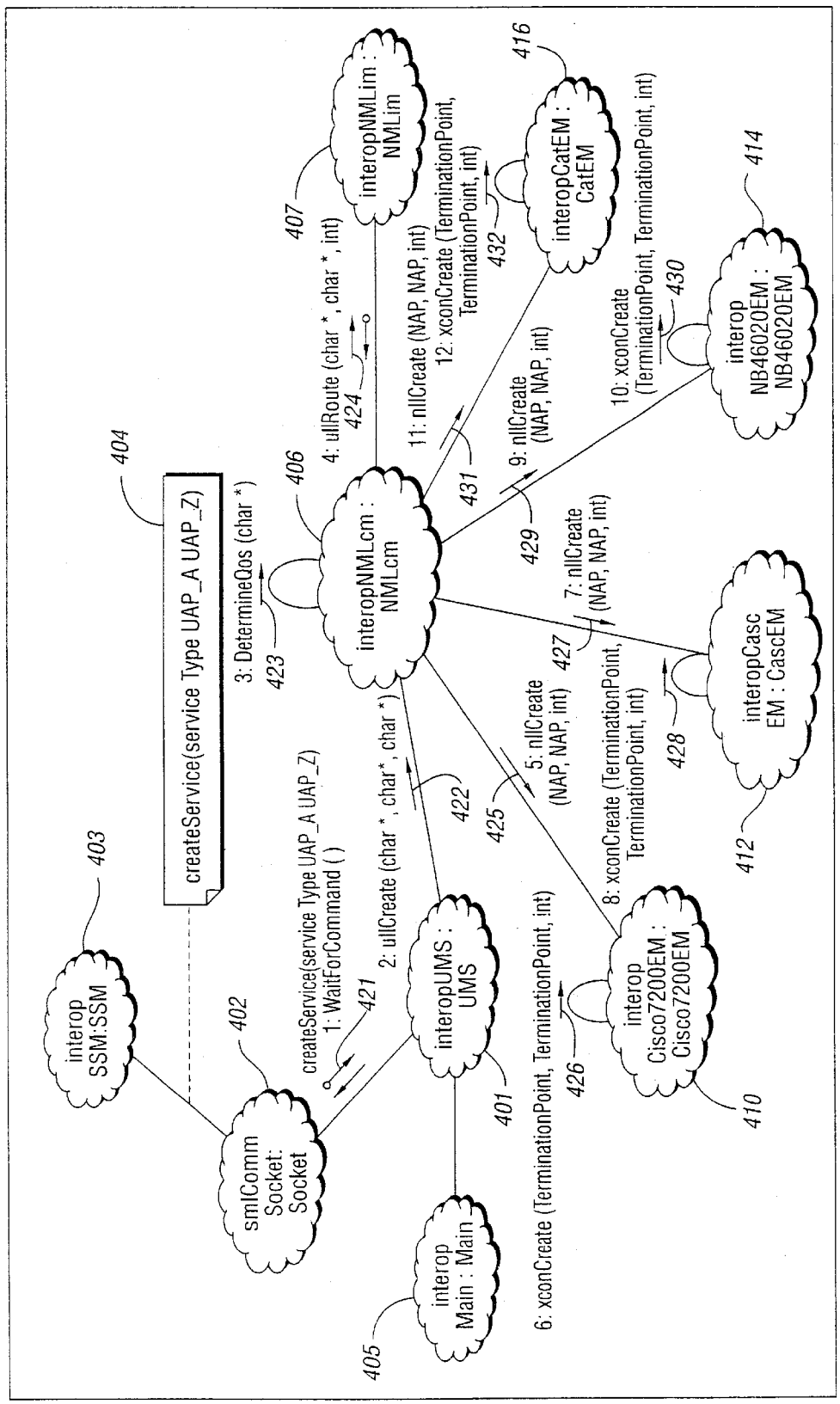
FIG. 16 shows a provision object diagram.

In FIG. 16, generally indicated at 400 is a provision object diagram.

Figure 17:
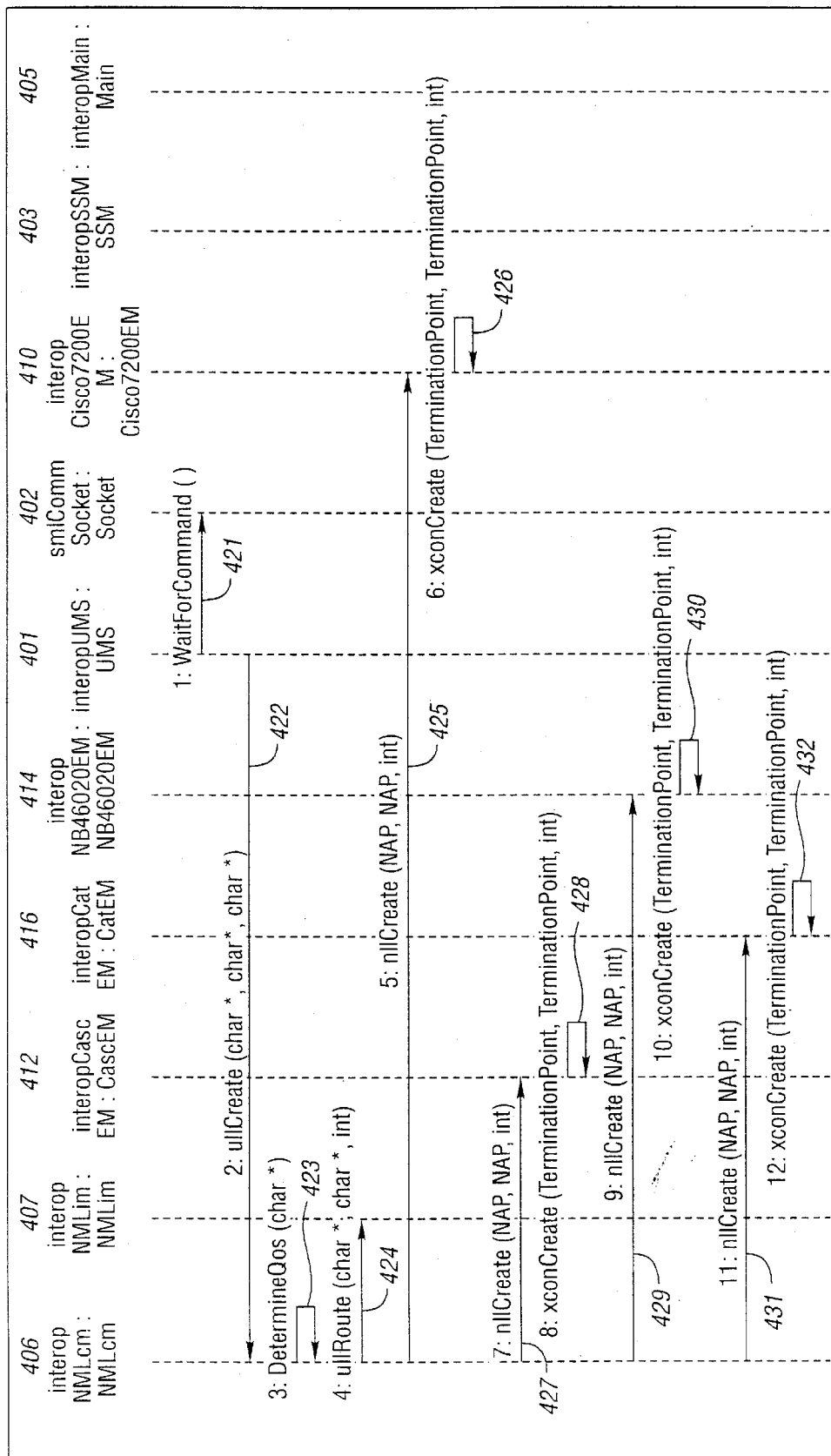
FIG. 17 shows a provision message diagram.

In FIG. 17, generally indicated at 420, is a provision message diagram. FIGS. 16 and 17 are best understood when viewed together in light of the below listed provision process.

In the prototype, provisioning takes place as follows:

1: waitForCommand( )—(421) UMS 401 waits for a command to create service from socket 402 (socket 402 receives a create service request 404 from SSM object 403).

2: ullCreate(char*, char*,char*)—(422) UMS 401 sends a ull create request to NMLcm 406.

3: determine Qos (char*)—(423) NMLcm determines quality of service for the network connection being constructed.

4: ullRoute(char*, char*, int)—(424) NMLcm 406 requests a route from the information manager, and as illustrated, from the NMLim 407; the route is returned as a linked list.

5: nllCreate (NAP,NAP, int)—(425) NMLcm 406 requests element manager 410 to create a network logical link across the subnet.

6: xconCreate(TerminationPoint,TerminationPoint,int)—(426) element manager 410 creates appropriate cross connections.

7: nllCreate(NAP,NAP,int)—(427)—NMLcm 406 requests element manager 412 to create a network logical link across the subnet.

8: xconCreate(Termination Point,TerminationPoint,int)—(428) element manager 412 creates appropriate cross connections.

9: nllCreate(NAP,NAP, int)—(429) NMLcm 406 requests element manager 414 to create a network logical link across the subnet.

10: xconCreate(TerminationPoint,TerminationPoint, int)—(430)—element manager 414 creates appropriate cross connections.

11: nllCreate (NAP,NAP,int)—(431) NMLcm 406 requests element manager 416 to create a network logical link across the subnet.

12: xconCreate(TerminationPoint,TerminationPoint, int)—(432) element manager 416 creates appropriate cross connections.

Figure 19:
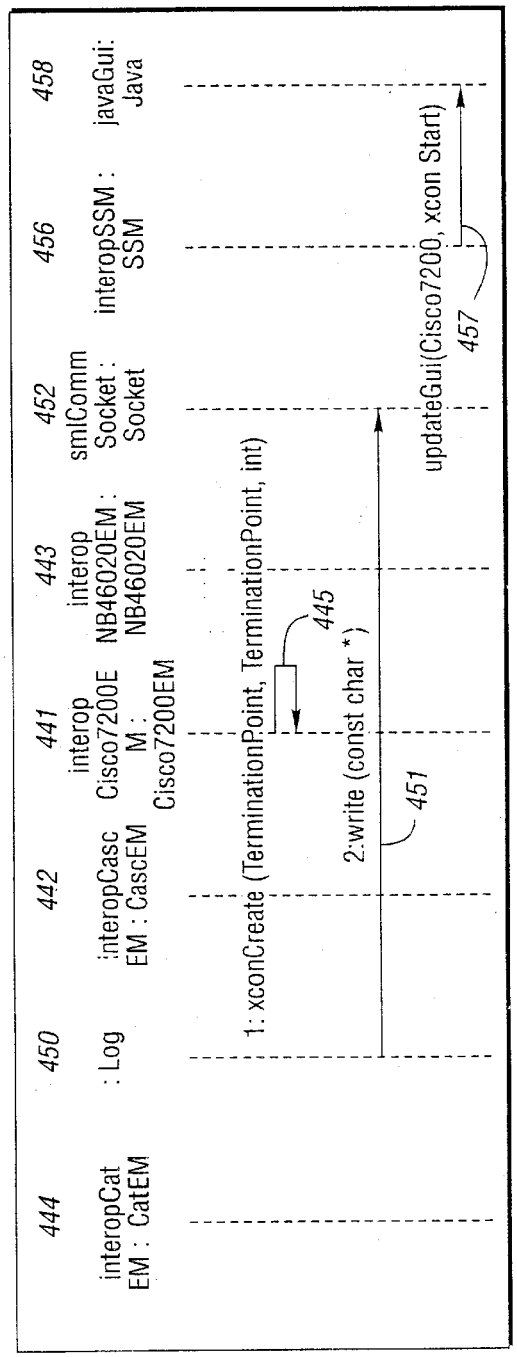
FIG. 19 shows a topology message diagram.
Figure 18:
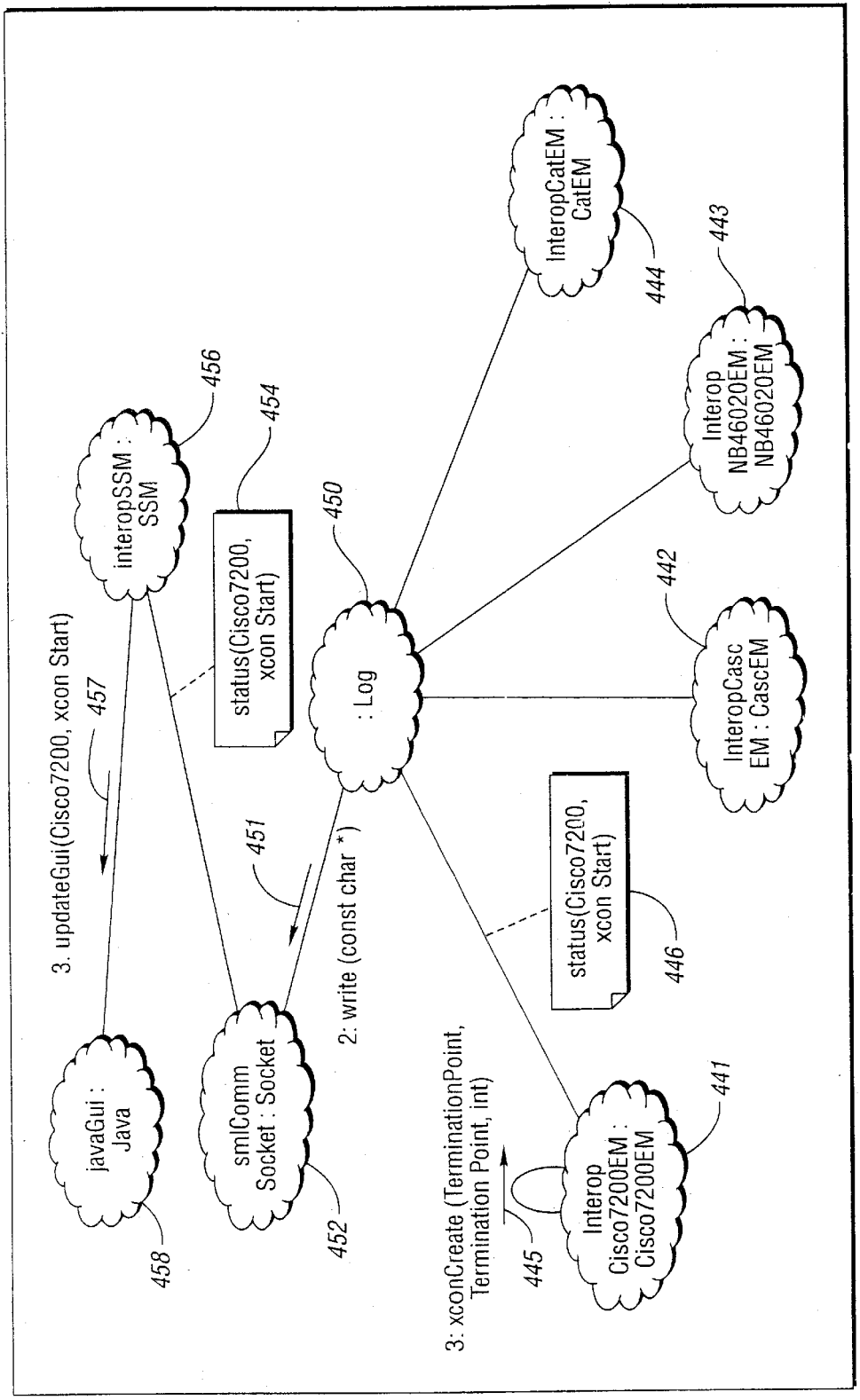
FIG. 18 shows a topology object diagram.

FIG. 18 and 19 are a topology object diagram and a topology message diagram, respectively. In FIG. 18, the topology object diagram is generally indicated at 440. The element managers 441, 442, 443, 444, create cross connects in their respective subnets, and information is logged into log object 450. For example, element manager 441 creates a cross connection (message 445, FIG. 19) and the status 446 of the connection is logged at 450. Log 450 sends message 451 (FIG. 19) to socket 452. The cross connect status 454 is presented to SSM 456. SSM 456 updates the graphical user interface (GUI) 458 by sending update GUI message 457 (FIG. 19).

In summary, the exemplary prototype Umbrella Management System is responsible for communication through well-efined interfaces to the SML and the EML. Operations, in the example (as other implementations may vary) are as follows.

control: The control method is called by the main routine upon initialization of the lower layers (NML and EML instances) and initialization of the communications path to the SML. The control method consists of an event loop which looks for requests from the SML (and possibly for requests and/or events from the lower layers).

createNMLcm: Return class is the NMLcm ID.

createSMLcomm: Creation of the communications path to the SML interface.

deleteNMLcm deleteSMLcomm initialize: The initialize method will be invoked from the main( ) routine. The UMS will then create the NML entities and open a communication channel (for example, a socket) to the SML.

shutdown: shutdown is called from the main routine. The UMS will then issue a shutdown method to the NMLcm, and if successful, delete it.

In summary, the exemplary GUI for the UMS prototype may send the following exemplary commands to the UMS:

createService(internetAccess, <epA>, <epZ>): This method makes a request to the UMS to create a Quality of Service (QoS) of type "internet access" with the associated end points A and Z.

deleteService(internetAccess, <epA>, <epZ>): This method makes a request to the UMS to tear down a Quality of Service (QoS) of type "internet access" with the associated end points A and Z.

shutdowns( ): This method requests the UMS to break the existing socket connection to the GUI. The UMS will then shutdown all of its processes gracefully.

playMovie(<filename>): This method is invoked when a video clip is to be played on the GUI. A file name is passed on the UMS and a shell command is executed to play the desired video clip.

In the GUI implementation for the prototype UMS, a two part application was supported by a graphical display. The first part was the UMS daemon, and the second part was the actual provisioning tool. Below, specific details of the exemplary GUI are described. It is appreciated that the GUI (and the associated applications) may vary based on the particular implementation, and that the GUI of the present invention is to be construed as much broader than the specific description below. Further, it is appreciated that a more general description of the GUI was given previously, near a more general description of the UMS.

The following is a guide to starting the UMS daemon and provisioning tool using a graphical user interface developed for the prototype UMS. Of course, it is appreciated that the graphical user interface may take many forms and that the specific description below is for the interface and associated daemon used for the prototype.

The UMS daemon (or other equivalent low level background process) and the provisioning tool are run on a workstation. Entry of an appropriate user name and password brings up the common desktop environment (CDE). The commands necessary to start the UMS and provisioning tool are all accessible at the CDE menubar at the bottom of the screen. The UMS daemon and provisioning tool could also be started from a UNIX shell (when the implementation is in a UNIX environment). Again, the particular two module UNIX example is the way that the GUI was implemented for the prototype. Of course, other techniques may be used in the alternative, and the description below is for a specific example.

Figure 20:
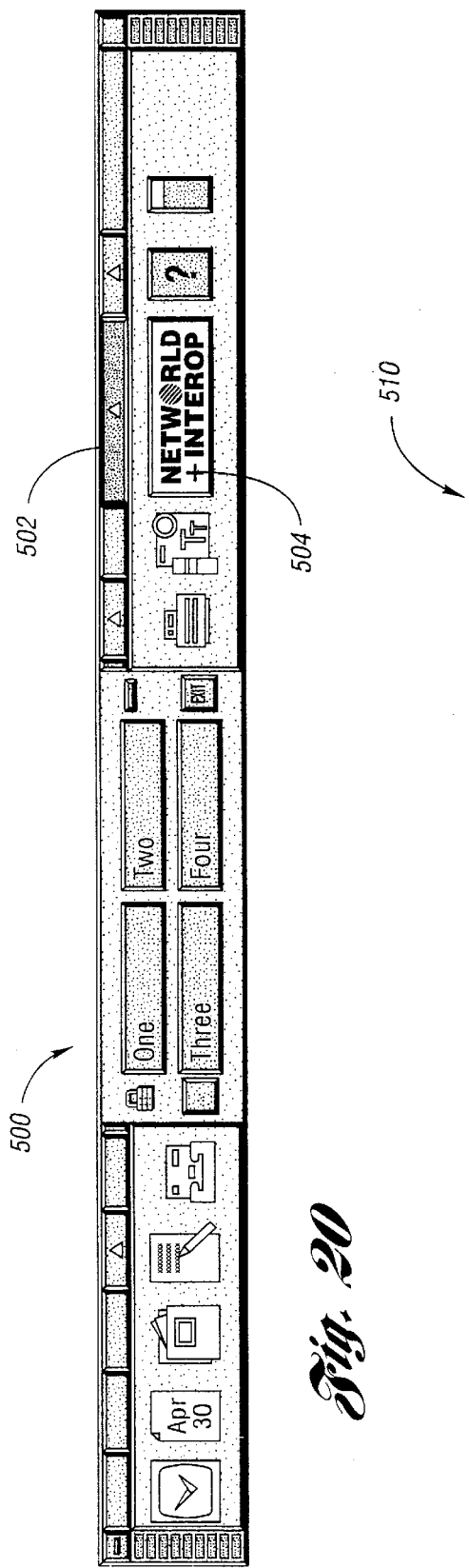
FIG. 20 is a screen display depicting a common desktop environment (CDE) menubar of a graphical user interface (GUI) for the Umbrella Management System (UMS)
Figure 21:
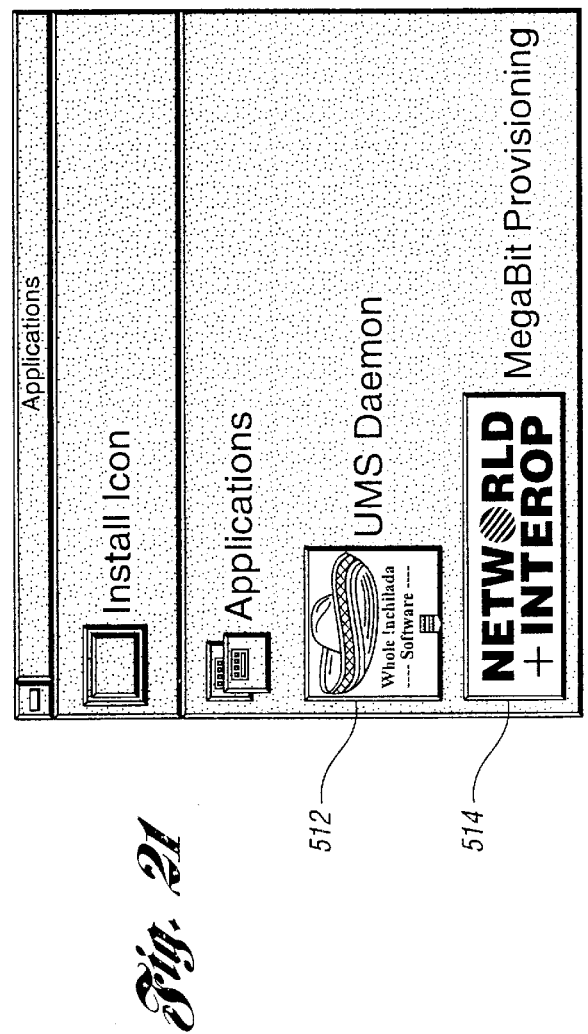
FIG. 21 is a screen display depicting an application subpanel that is accessible through the menubar of FIG. 20.

As shown in FIG. 20, the menubar is generally indicated at 500. Clicking on the up-arrow 502 above the Interop icon 504 on the menubar 500 opens the Interop applications subpanel (FIG. 21, number 510). In the subpanel, clicking on the whole !nchilada sombre icon 512 starts the UMS daemon, sending its output to a log file. The log file is called /tmp/ums.log.<NUM>, where <NUM> is a number that increases with each invocation of the UMS daemon.

Once the daemon is running, the provisioning tool is started by clicking on icon 514. The provisioning tool, in the example, is a JAVA applet that runs within a browser or virtual machine. Of course, a JAVA applet is an exemplary way to implement the tool, and other approaches, such as ACTIVE X may be taken instead. Clicking on the icon 514 launches the browser or virtual machine, preferably automatically, and starts the provisioning tool.

Figure 22:
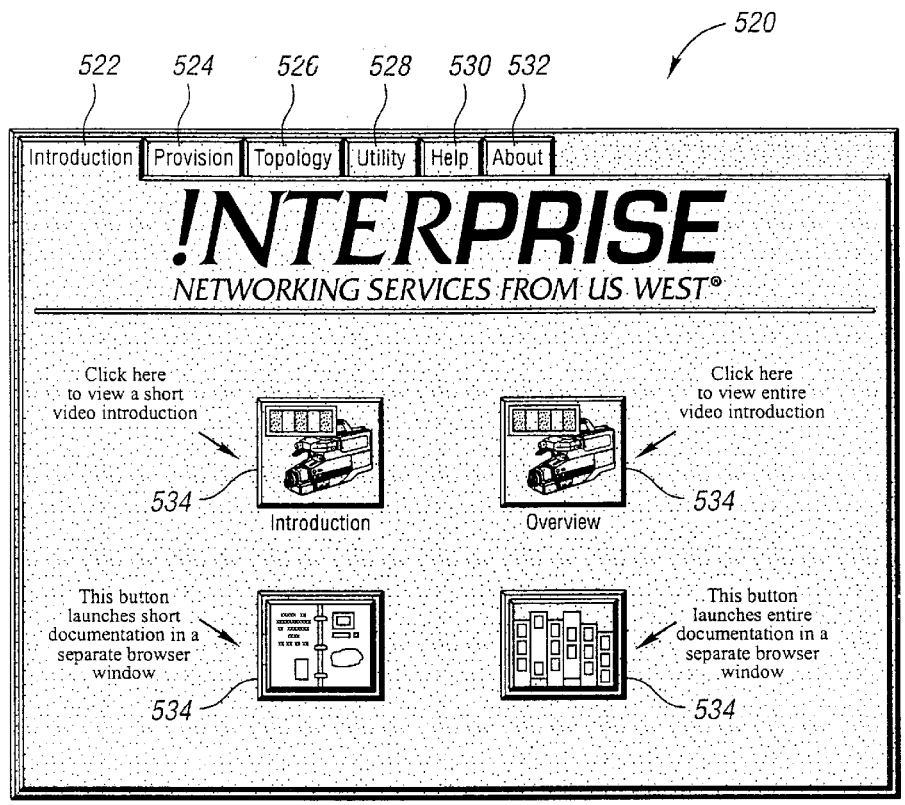
FIG. 22 is a screen display depicting a provisioning tool, with the introduction tab in front, that is used to interface with the Umbrella Management System (UMS)

As shown in FIG. 22, the display for the provisioning tool preferably includes a plurality of tabs: introduction tab 522, provision tab 524, topology tab 526, utility tab 528, help tab 530, and about tab 532. The provisioning tool itself is generally indicated at reference numeral 520. Introduction tab 522 presents a number of buttons/icons 534 that can be activated to bring up introduction materials such as text or multimedia.

The provisioning tab, shown in FIG. 23, provides information at the service management layer (SML). The system user that is provisioning the service only needs to provide first and second service access points (SAPs). At blanks 540, end point A is selected, as directed by the graphic display in provision tab 524. The Z end point is selected at blanks 542. Of course, other options such as menu driven options may be used to select the end points, as is appreciated by those skilled in the art of graphical user displays. In the application illustrated, end point A is an Internet service provider (ISP) or a company host site. End point Z represents the subscriber that is trying to connect to an ISP or company host site. The subscriber is preferably identified by his or her unique phone number (or address or other equivalent identifier, as appropriate). Each of the phone numbers on the list may correspond to each different phone number accessible by the user's computer.

Once both end points have been selected, the graphical interface directs the user, that is, gives the user the option to, initiate a connection build. A connection build is initiated by pressing the green light 546 of the stop light symbol shown in the bottom of the provision tab 524. Pressing button 546 immediately brings up the topology tab (FIG. 24, number 526) and a view of the network management layer (NML) (FIG. 25, generally indicated at 560). The red light 548 in FIG. 23 is pressed to terminate a previously built connection.

With continuing reference to FIGS. 24 and 25, the user is given live feedback (in preferred embodiments) while the service is being provisioned. First, the cloud 554 turns yellow to indicate that the service is in appending state. The ISP end of the connection is indicated at 550, while the subscriber end is indicated at 552. Second, (in the prototype) the various icons 562, 564, 566, 568 in the management layer 560 will turn yellow as the connection across each subnetwork pends. That is, in the network management layer 560, an icon corresponds to each appropriate subnetwork in the end to end connection being made. The example illustrated shows the four icons for the four subnets of the prototype, but of course, this is just an example. Network Management Layer 560 appropriately displays all subnets along the route between the A and Z ends of the connection.

In preferred embodiment, as provisioning across a subnetwork proceeds, the icon for that subnetwork turns green. If unsuccessful, the icon turns red. After each subnet has been provisioned (turns green), the cloud 554 in FIG. 24 will change color to green or red to indicate the result of the entire process. If cloud 554 is green, then installation of the network connection was successful and clean.

In FIG. 26, the element management layer for a subnet is generally indicated at 570. In preferred embodiments, the system user may expand any one of the subnet icons of FIG. 25 to show the corresponding element management layer. In FIG. 26, the element management layer includes a series of crossconnects 572 and physical links 574 forming a network logical link.

That is, in summary, in a preferred embodiment, when the system user clicks on an icon in the NML frame, a new window is opened which shows the backplane and crossconnect of each element. In addition, in preferred embodiments, when the system user clicks on any of the images in NML layer 570 of FIG. 26, another window (for example, as shown in FIG. 27) is opened that shows the exact provisioning information. As shown in FIG. 27, provisioning information is generally indicated at 580 and includes (in an ATM example) virtual path identifier/virtual channel identifier (VPI/VCI) information 582, 586, and port information 584, 588.

Figure 28:
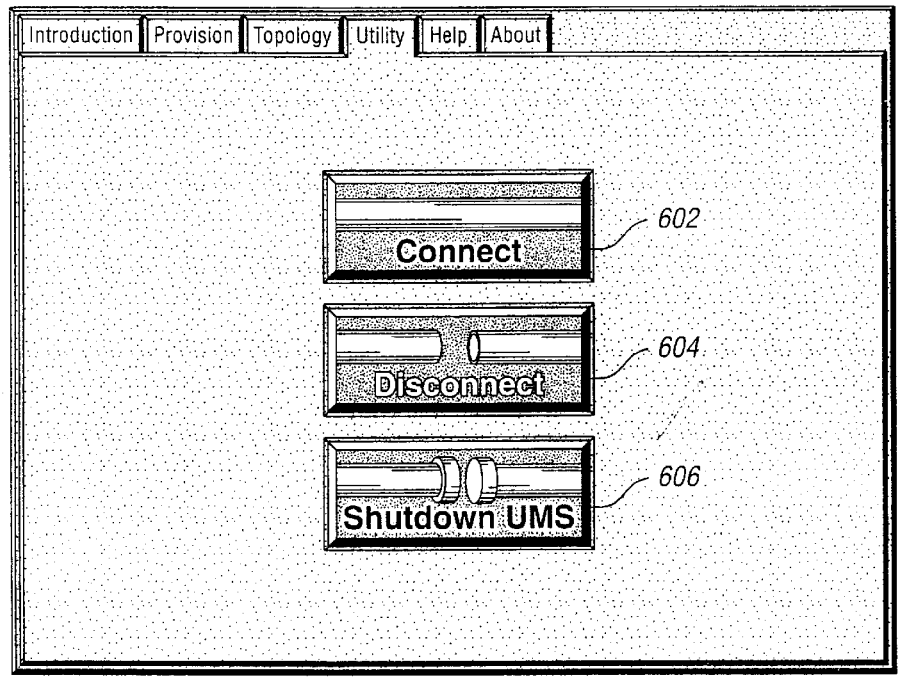
FIG. 28 is a screen display depicting shutting down the provisioning tool.

In FIG. 28, the utilities tab 528 shows several optional utilities that may be provided with the provisioning tool. For example, utilities may be provided for connecting and disconnecting the provisioning tool from the UMS daemon, with these utilities being activated by connect and disconnect buttons 602 and 604, respectively. Further, a shutdown button 606 may be provided to cause both the provisioning tool and the UMS daemon to exit. Thereafter, a browser or virtual machine or other running process that was assisting the provisioning tool should also be shutdown, including the menubar, prior to restarting the different system processes to reattempt to provision service.

Figure 29:
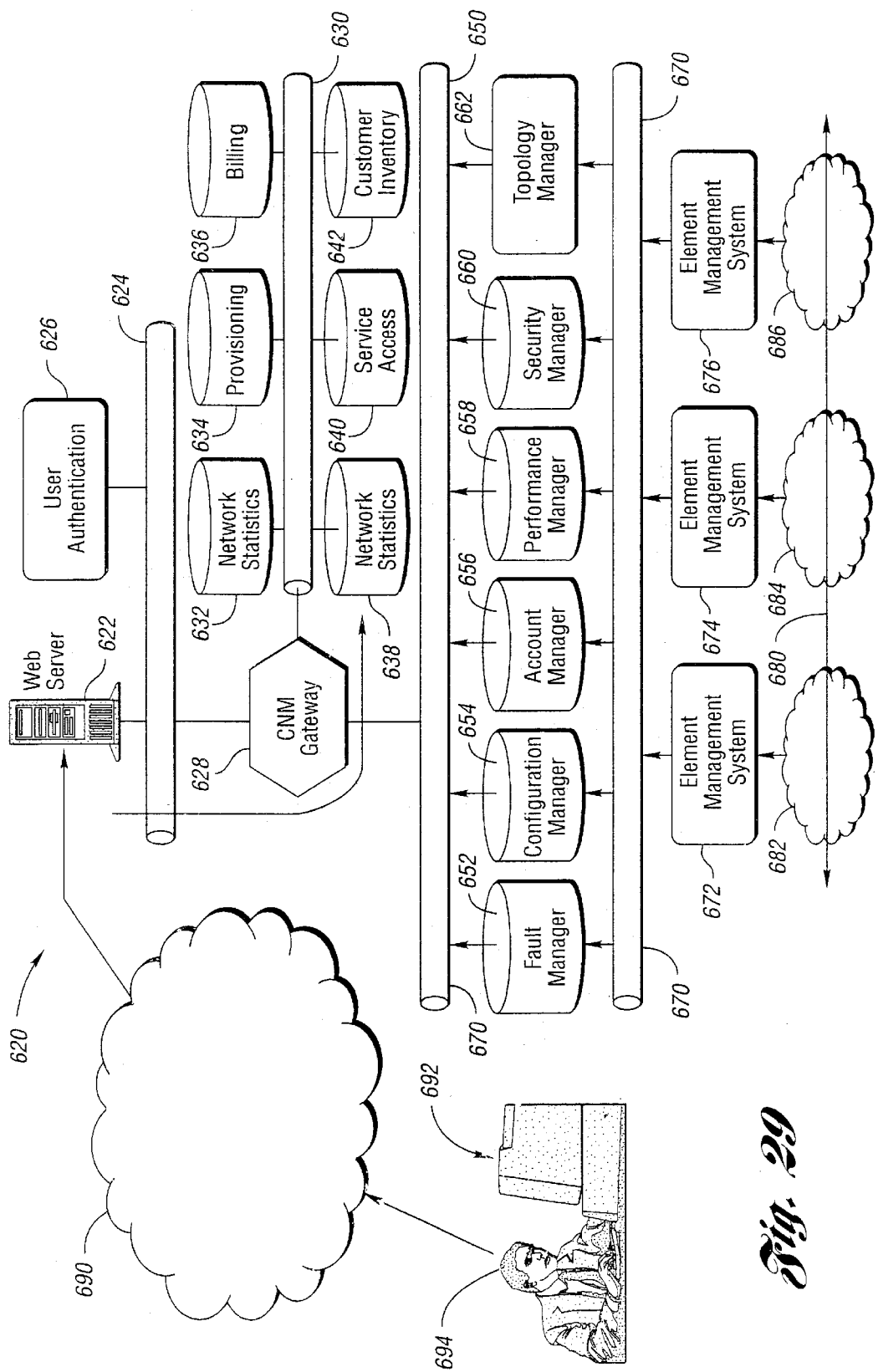
FIG. 29 is another system block diagram, illustrating a user communicating with the UMS to perform, for example, remote provisioning possibly including bandwidth on demand.

In FIG. 29, scalable bit rate service selection, which is present in some implementations of the present invention, is illustrated. The system 620 in FIG. 29 is preferably the UMS shown in FIGS. 1 and 2, with FIG. 29 having the UMS running at server 622. It is appreciated that the below description describes a preferred network system (the UMS) for use with methods and software for scalable bit rate service selection, and that these embodiments of the invention are to be construed in accordance with the broader summary given previously, with the below description explaining the preferred embodiments.

Scalable service selection for XDSL allows customers to self-select their desired access service speeds and features via a (preferably web) interface to the service platform, which is preferably the UMS described previously. These embodiments of the invention provide on-line access control through a customer's public or private network connection. Methods and procedures implement scalable rate selection and control the user or customer's XDSL connection by throttling customer access PVCs at the ATM assigned switch port.

These embodiments of the present invention take advantage of rate adaptive modem capabilities. Modems that adapt to the current bit rate of the user PVC enable offering customers varying classes of services, on-demand. Rate adaptive modems in combination with embodiments of the present invention that provide customer controlled PVC throttling mitigate additional truck-rolls and technician dispatches via remote network provisioning of service upgrades to higher (or lower) classes of service. In addition to bandwidth on-demand, embodiments of the present invention provide on-line access to customer applications such as provisioning control, and fault and performance analysis. Examples of hardware having rate adaptive modem capabilities are the Cisco 605PCI ADSL modem and the Cisco 675 ADSL router, available from Cisco Systems.

The system of the present invention in FIG. 29 preferably operates from the customer's premise via a graphical interface, either web-based or provided to the customer with the service. Through that interface, customers have access via the Internet if they have a public service, or via an intranet or a private connection, back to a web-based browser or server environment 622. Access to gateway bus 624 preferably is controlled by user authentication 626. Authentication and security provisions are preferably incorporated so that individual customers can be discretely identified and given access and control to only the services or capabilities that the customer subscribes to or currently has in service. After authentication of the customer, various different levels of controlled access may be granted to the customer to allow access to the system environment, through gateway 628.

The service management layer includes the SML communication bus 630, and various applications such as trouble ticketing 632, provisioning 634, billing 636, network statistics 638, service access 640, and customer inventory 642. The applications are specific applications that customers would have access to and can write to which give the customers control of functional areas. For example, through the trouble ticketing system in the SML layer, which in turn communicates with the fault manager in the network management layer, on-line access to the trouble ticketing system is available so that customers can create, add or add logs to, or delete or close trouble tickets.

At the network management layer, NML communication bus 650 provides communication with various databases or functional areas. For example, the customer may communication over the NML bus 650 with fault manager 652, configuration manager 654, account manager 656, performance managers 658, security manager 660 and topology manager 662.

To provide access to configuration parameters another graphical interface could be provided to the customer that gives them the capability of moving connections around, among other things. For example, if customer is at home and connected to a particular ISP one day, and the next day the customer wants to be connected to a different ISP, the customer can move his or her own connection (in some embodiments of the present invention) without going through the customer service center. Furthermore, in preferred embodiments that utilize the UMS, the customer can move the connection on-line, dynamically, such that as soon as he or she hits the appropriate button on a graphical user interface (GUI), the system of the present invention would tear down the connection to the first ISP and build a new connection to the second ISP. That is, the GUI and UMS are not restricted to access by care agents only.

At the same time, as a configuration option, in accordance with the scalable bit rate selection feature of some embodiments of the present invention, the customer could also change his or her speed. For example, if the customer is working at 256 kbps, he or she could change to 512 kbps or 768 kbps and the application has the ability to interface with the UMS to determine if that type of speed is available to the customer in advance. So, for example, there may be a screen provided where the customer could hit a button and go on to find out what bandwidth options are available. The customer could then select one of the different speeds offered and send a message back to the system server indicating the speed selected such that the system may remotely provision the appropriate switch for it to throttle the PVC to the customer.

Of course, prior to allowing a customer to make a selection, the system should perform a security authentication to give the customer permission to make changes. Further, preferably, after the selection is made, the system changes the customer's billing structure. In addition, preferred embodiments that provide scalable bit rate by throttling the PVC at the ATM switch port allow the customer to select a time duration for the selected bandwidth. For example, the customer could select an increased bandwidth for the next five minutes, for one day, or permanently.

The account manager provides information such as a profile of the current set-up of an account, current services billed for, and month-to-date billing data. The performance manager provides information about how the connection is operating, giving the customer the ability to do self-help and diagnose problems. Through the performance manager, a customer is able to tell if problems are at the customer end or the host end.

The security manager provides the ability to determine who can have access to an account, who can change the account, and who has permission to read and write to the account. Lastly, topology provides the ability for one to look at the entire network to see what the network looks like and the current connections, including what customers are provisioned for and what the bandwidth settings currently available to those subscribers are.

The element management layer (EML) is the vendor provided well-defined interfaces. Every supplier of network hardware should provide a very well-defined interface (type of connection and how it is to behave) so that these applications can work in accordance with the present invention at the higher layers. The communication bus is indicated at 370, and the element managers at 672,674,676. The clouds 682,684,686 represent the elements. For example, a central office switch is in the cloud format and the element management system of the central office is a software application that the supplier of the switch provides or that is written in accordance with the well-defined interface to control provisioning of the switches.

In summary, the scalable service rate selection in accordance with the present invention allows a user 694 from his or her home or office computer 692 to communicate over a network 690 (Internet or intranet) with server 622. Server 622 allows the user to remotely provision a switch in his or her PVC to throttle the bandwidth. Preferably, server 622 operates as the UMS described herein. Further, a suitable technique for throttling the PVC is to throttle the switch at the ATM interface port (or at the DSLAM when the implementation is ATM over DSL).

Figure 30:
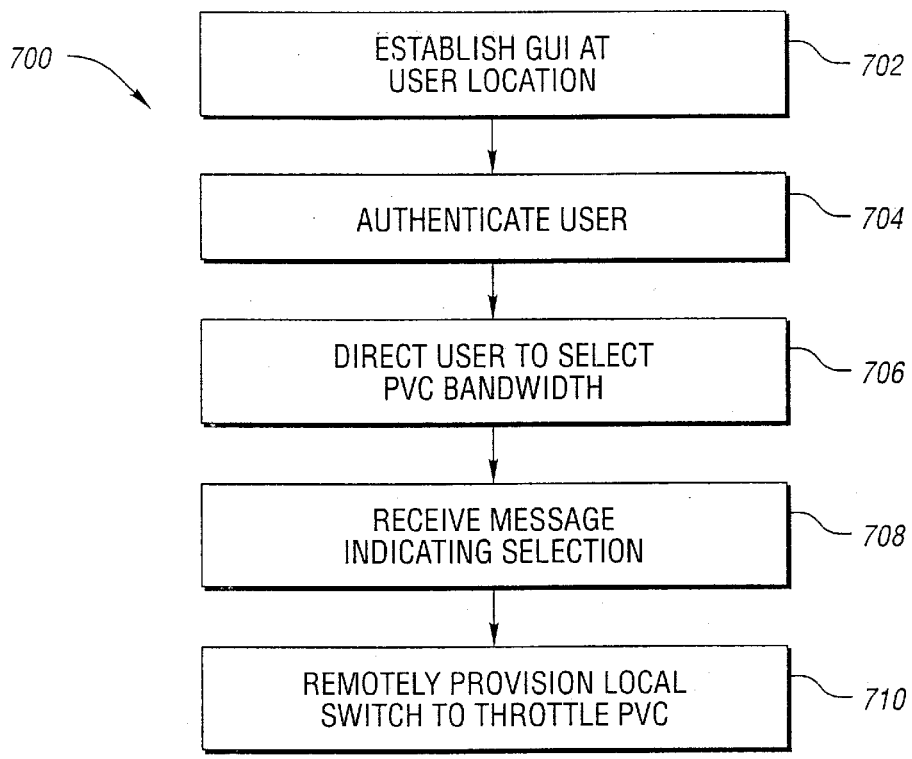
FIG. 30 is a block diagram illustrating yet another method of the present invention.

In FIG. 30, a method of the present invention for providing a customer the ability to remotely provision a network switch and throttle his or her PVC is generally indicated at 700. At block 702, the graphical user interface is established at the user location. At block 704, the user is authenticated. At block 706, the user is directed to select a desired permanent virtual circuit (PVC) bandwidth (or bit rate). At block 708, the system server receives a message indicating the user selection. At block 710, the local switch is remotely provisioned to throttle the user PVC in accordance with the selected bandwidth.

Figure 31:
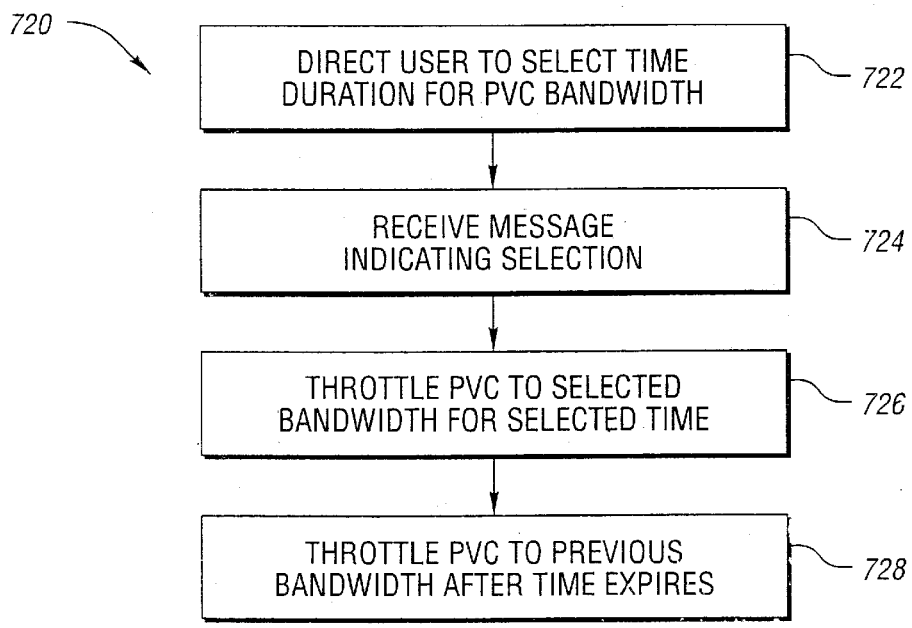
FIG. 31 is a block diagram illustrating additional steps in a preferred method.

In preferred embodiments for implementing the method of the present invention for scalable service rate selection, the throttling of the PVC may be performed for a selected period of time, as generally indicated at 720 in FIG. 31. At block 722, the user is directed to select a time duration for the selected PVC bandwidth. At block 724, the system server receives a message indicating the user's selected time (and the selected bandwidth). At block 726, PVC is throttled to the selected bandwidth for the selected amount of time. At block 728, the PVC is then throttled to a previous bandwidth after the period of time expires. That is, the customer may select a desired bandwidth (for example, a customer normally receiving 256 kbps may select a desired PVC bandwidth of 512 kbps), and a desired time (for example, the customer may wish to have the increased bandwidth for one hour or one day). The PVC is throttled to the selected bandwidth for the desired period of time, and thereafter, the PVC is throttled to the previous bandwidth.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A network management system for configuring a network connection between a first service access point and a second service access point over a network including a plurality of subnets, each subnet having a corresponding element type and including at least one programmable element of that type, each element type having a corresponding element manager, the system comprising:

an information manager including routing information for the network, and operative to determine a route made up of links over the network from the first point to the second point, wherein a network-to-network link connects a pair of adjacent subnets having elements of different types and a network logical link provides a path across a subnet; and a configuration manager operative to establish a connection across each subnet on the route by sending a request to the corresponding element manager to program the at least one subnet element in accordance with the network logical link across that subnet, and operative to establish a network-to-network connection between adjacent subnets on the route in accordance with the network-to-network link between those adjacent subnets to provide the network connection between the first point and the second point.

2. The system of claim 1 wherein the route determined by the information manager is in the form of a link list.

3. The system of claim 2 wherein the link list is represented by a user logical link composed of a series of network logical links connected by network-to-network links, the series beginning with an originating link and ending with a terminating link.

4. The system of claim 1 wherein the information manager further operates to determine the path for each network logical link, each path being made up of links over the subnet wherein a cross connection provides a path across an element and a physical link connects a pair of adjacent elements, the configuration manager establishing the connection in accordance with the path for each subnet.

5. The system of claim 4 wherein a path for a network logical link includes a series of elements wherein a cross connection provides a path across an element and a physical link connects a pair of adjacent elements.

6. The system of claim 1 further comprising:

a user interface configured to allow a user to utilize the information manager and the configuration manager to establish the network connection.

7. The system of claim 6 wherein the user interface is a graphical user interface (GUI).

8. The system of claim 7 wherein the interface is in a browser executable format.

\* \* \* \* \*